United States Patent [19]
Smith

[11] Patent Number: 6,025,693
[45] Date of Patent: Feb. 15, 2000

[54] MOTOR STARTER

[76] Inventor: Otto J. M. Smith, 612 Euclid Ave., Berkeley, Calif.

[21] Appl. No.: 08/954,588

[22] Filed: Oct. 20, 1997

[51] Int. Cl.$^7$ .................................................. H02P 1/26
[52] U.S. Cl. ...................... 318/768; 318/771; 318/781; 318/794
[58] Field of Search .................. 318/771, 768, 318/778, 781, 794, 795

[56] References Cited

U.S. PATENT DOCUMENTS

| | | | |
|---|---|---|---|
| 4,035,701 | 7/1977 | Jensen | 318/771 |
| 4,484,125 | 11/1984 | Hertz | 318/768 |
| 4,675,591 | 6/1987 | Pleiss | 318/773 |
| 4,792,740 | 12/1988 | Smith | 318/768 |
| 4,947,072 | 8/1990 | Watkins et al. | 310/179 |
| 5,049,800 | 9/1991 | Kohari et al. | 318/771 |
| 5,065,305 | 11/1991 | Rich | 363/150 |
| 5,068,559 | 11/1991 | Satake et al. | 310/112 |
| 5,068,587 | 11/1991 | Nakamura et al. | 318/771 |
| 5,142,213 | 8/1992 | Stelter | 318/771 |
| 5,300,870 | 4/1994 | Smith | 318/768 |
| 5,545,965 | 8/1996 | Smith | 318/768 |
| 5,614,799 | 3/1997 | Anderson et al. | 318/439 |
| 5,621,296 | 4/1997 | Werner et al. | 318/768 |
| 5,818,195 | 10/1998 | Frick et al. | 318/771 |

*Primary Examiner*—Brian Sircus
*Attorney, Agent, or Firm*—Flehr Hohbach Test Albritton & Herbert LLP

[57] ABSTRACT

An improved method of starting three-phase and three-winding induction motors from a single phase supply reconfigures the 6 accessible windings of a standard induction motor into first an optimal starting configuration which, for example, may reduce starting torque or starting current and then an optimal run configuration. One example of a run configuration is a normal delta along with an inverted delta; another example is a (voltage phasor half-hexagon) run configuration where the windings are all series connected with 120° phase differences.

54 Claims, 17 Drawing Sheets

MOTOR STARTER

This present invention is directed to improved methods of starting three-winding single-phase and three-phase induction motors.

BACKGROUND OF THE INVENTION

Alternating-current induction motors have starting currents which are several times larger than their full-load running currents. This high starting current is a disadvantage, requiring large copper conductors in the power system distribution lines, and requiring distribution transformers sized for the large currents. Examples of motors to which this invention is applied and of single-phase motors which have this starting characteristic are given in U.S. Pat. No. 4,792,740, issued Dec. 20, 1988 to Otto J. M. Smith, entitled "Three-Phase Induction Motor With Single-Phase Power Supply." This invention is an improved method of starting these motors. Further examples of induction motors to which this invention applies are given in U.S. Pat. No. 5,300,870, issued Apr. 5, 1994, entitled "Three-Phase Motor Control," and in U.S. Pat. No. 5,545,965, issued Aug. 13, 1996, entitled "Three-Phase Motor Operated From A Single-Phase Power Supply And Phase Converter," both issued to Otto J. M. Smith. The winding circuit of the '870 patent is called a Semihex™ configuration. Here, the 3 windings have 120° phase differences but are series connected (as compared to wye or delta).

The starting currents of induction motors have poor power-factors, which is undesirable because the power supply company must provide a large starting current, although the wattage for which the company is paid is small.

The full-load currents of induction motors have poor power-factors, which is undesirable because the power supply company must provide a large full-load current, although the wattage for which the company is paid is smaller.

Some loads which must be started gently require reduced-torque starting, and new methods for doing so are disclosed herein.

Three-phase wye-start delta-run motors are common for large motors. The wye-start circuit reduces the voltage per winding, reduces the magnetic flux in the air gap, reduces the starting current, and reduces the shaft starting torque.

OBJECTS AND SUMMARY OF THE INVENTION

It is a general object of the present invention to provide an induction motor with a circuit which reduces the starting current in the alternating-current power supply.

It is another object of this invention to provide an induction motor with a circuit which causes maximum starting torque and reduces the line starting current.

It is another object of this invention to provide an induction motor with a circuit which causes reduced starting torque for a "soft-start."

It is another object of this invention to provide an induction motor with a starting current which is closer to unity power factor to benefit the power company.

It is another object of this invention to provide an induction motor with a full-load current which is closer to unity power factor to benefit the power company.

In one embodiment, the motor windings are connected in one configuration for full-load operation, and a second bank of starting capacitors has a different configuration for starting.

In one aspect of the invention, the 6 windings of an induction motor are connected with 3 of the windings comprising a delta connection, and the other 3 of the windings comprising an inverted delta connection. The series connection of the delta and the inverted delta is connected across a single-phase power supply. Four of the winding corners of the deltas are used in the series connection. Two external winding corners created by the series connection are the winding corners not connected together and not connected to the supply lines. One run capacitor is connected between one external corner and one of the supply lines. A second run capacitor is connected between the other external corner and the other of the supply lines. A time-delay relay connects a starting capacitor between the external corners and removes the starting capacitor after a preselected time interval.

In another aspect of this invention, a second starting capacitor is connected between one external corner and the other supply line, and a third starting capacitor is connected between the other external corner and the one supply line.

In another aspect of this invention, the run capacitors are connected as above, and for starting, the windings are reconnected all in series in a four-terminal Semihex circuit, with several different voltage phase angles between the four terminals, with the power supply lines connected to terminals 1 and 3 in this series, and with a starting capacitor connected between terminals 2 and 4 in this series. An improved timed-interval starting relay controls the winding reconnection and connection.

For small motors, this invention provides improved power-factor on the single-phase line. For large motors, this invention provides reduced flux starting for either "soft-start" reduced shaft torque or reduced starting current in the single-phase supply, or both.

The starting current of an induction motor has both an in-phase component or power component and an out-of-phase var (volt-ampere-reactance) component. In this invention, the out-of-phase var component is provided by starting capacitors, and only the in-phase or power component is provided by the power supply. By this means, the power supply current is reduced to a small fraction of the winding current or the uncompensated starting current.

PRIOR ART—THREE-PHASE MOTORS

Figure 5A:
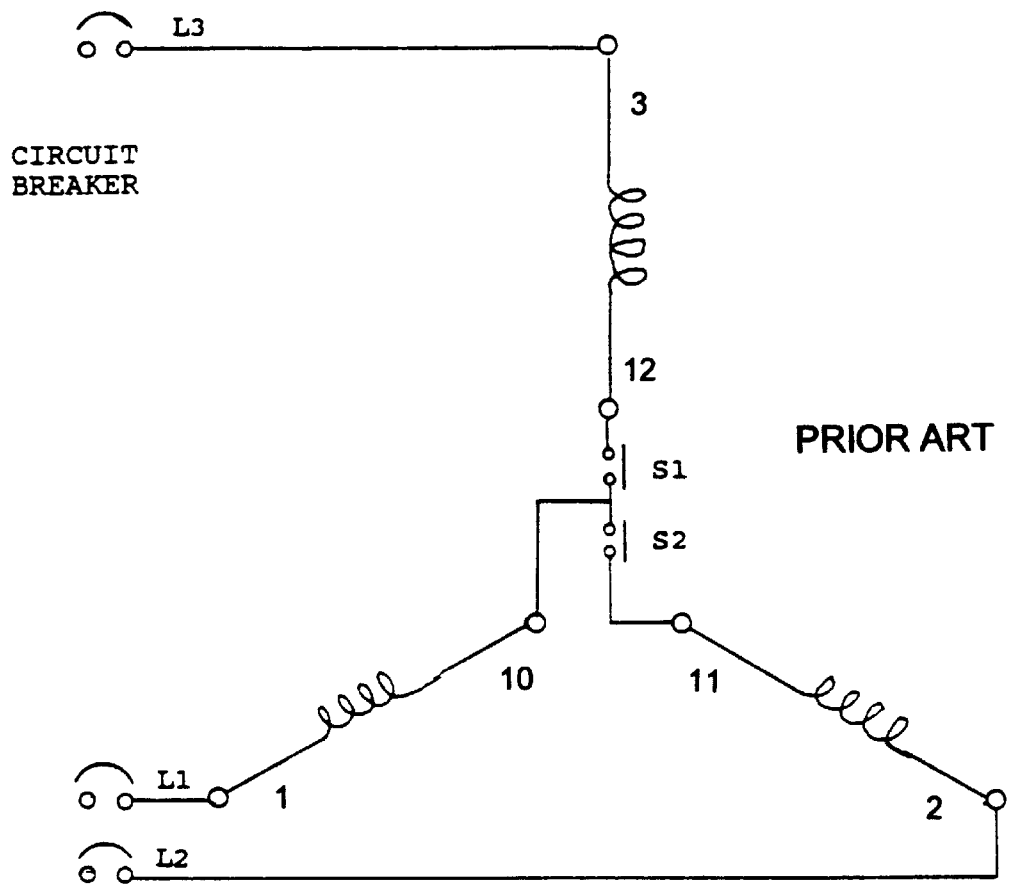
FIG. 5A is a prior art wye-start reduced-flux connection for a three-phase motor on a three-phase line.
Figure 5B:
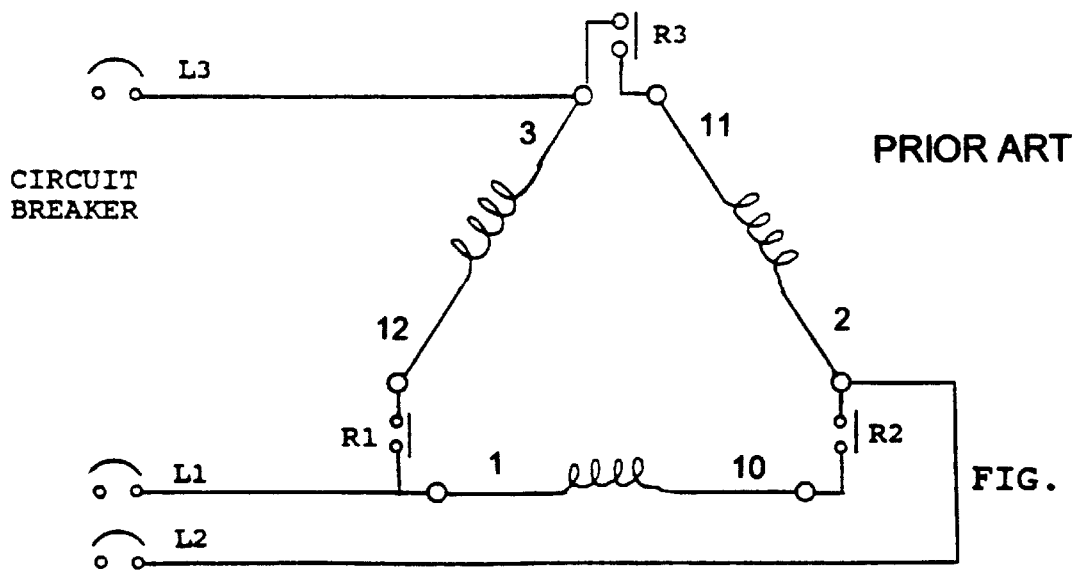
FIG. 5B is a prior art delta-run connection for a three-phase motor on a three-phase line.

Three-phase wye-start delta-run motors are common in the industry, and FIG. 5A and FIG. 5B summarize this circuit, to establish the vocabulary and terminology of this prior art soft start. This is a winding-switching circuit.

This 3-phase circuit is used when the full-voltage high starting current is unacceptable by the power supply company, or when the service wiring to the motor is insufficient, or when the load is sensitive to high torques, or to prevent water hammer.

The start connection of the motor windings is shown in FIG. 5A. The 3-phase power supply L1, L2 and L3 is connected to winding terminals 1, 2 and 3. A start contactor with contacts S1 temporarily connects terminal 10 to terminal 12 and contacts S2 connect terminal 10 to terminal 11 for the starting interval. A first motor winding has terminals 1 and 10. A second motor winding has terminals 2 and 11 for the starting interval. The voltage on this winding has a 120° phase relationship to the voltage between 1 and 10. In the motor stator, the second winding is displaced 120 electrical degrees from the first winding. A third motor winding has terminals 3 and 12. The phase of the voltage on this winding is displaced 120 electrical degrees from the voltage between 1 and 10, and also displaced 120 electrical degrees from the voltage between 2 and 11. For a supply voltage of V, the winding voltages during starting are approximately 0.58×V. The airgap magnetic flux is a function of this winding voltage. In addition, the winding carries a current whose in-phase component delivers power to the winding. The interaction of the in-phase component of current with the airgap magnetic flux produces the shaft torque for acceleration and to counteract friction. The phase sequence in FIG. 5A is 3-2-1 for CW shaft rotation, using the USA convention for numbering the winding terminals.

After the above starting interval, the two S contacts open in FIG. 5A, and the three run contactor contacts R1, R2 and R3 close in FIG. 5B, connecting 12 to 1, 10 to 2 and 11 to 3 respectively. This completes a delta connection. Each winding has the full line voltage V. This run-connection winding voltage and corresponding airgap magnetic flux is 1.732 times the starting voltag e and corresponding starting flux.

This wye-start circuit reduces the starting line current to 33% of the value which it would have had on full-voltage delta starting. The locked-rotor starting torque with the wye circuit is approximately one-third of the locked-rotor torque which would have been produced by this delta connection.

The present invention I will apply other kinds of winding-switching circuits to single-phase motors.

DESCRIPTION OF THE PREFERRED EMBODIMENTS

The starting currents in the windings of 3-symmetrical-winding typical induction motors lag the respective winding voltages by approximately 75°, and have a power-factor of approximately 26%. The in-phase or power component of this winding starting current is IP=0.26×IS, where IS is the magnitude of the winding starting current. The out-of-phase or var component of the starting current is (0.996×IS) approximately. Stated differently, the winding starting current magnitude is IS=3.86 IP. Only the in-phase component needs to be purchased from the power supply system. The out-of-phase components for the windings can be provided by the local capacitor controls.

In the preferred embodiments, nearly all of the var component of the winding starting current is provided by starting capacitors.

The power component of the starting current is supplied by the in-phase current component delivered by the single-phase power supply from the public utility or from an inverter from a solar photovoltaic system. By this means, the starting current from the supply is reduced to about 26% of its uncompensated value.

The var component is provided by switched starting capacitors. These provide the airgap magnetic flux, which is necessary for the airgap torque.

Double-Delta Run Circuit

Figure 1:
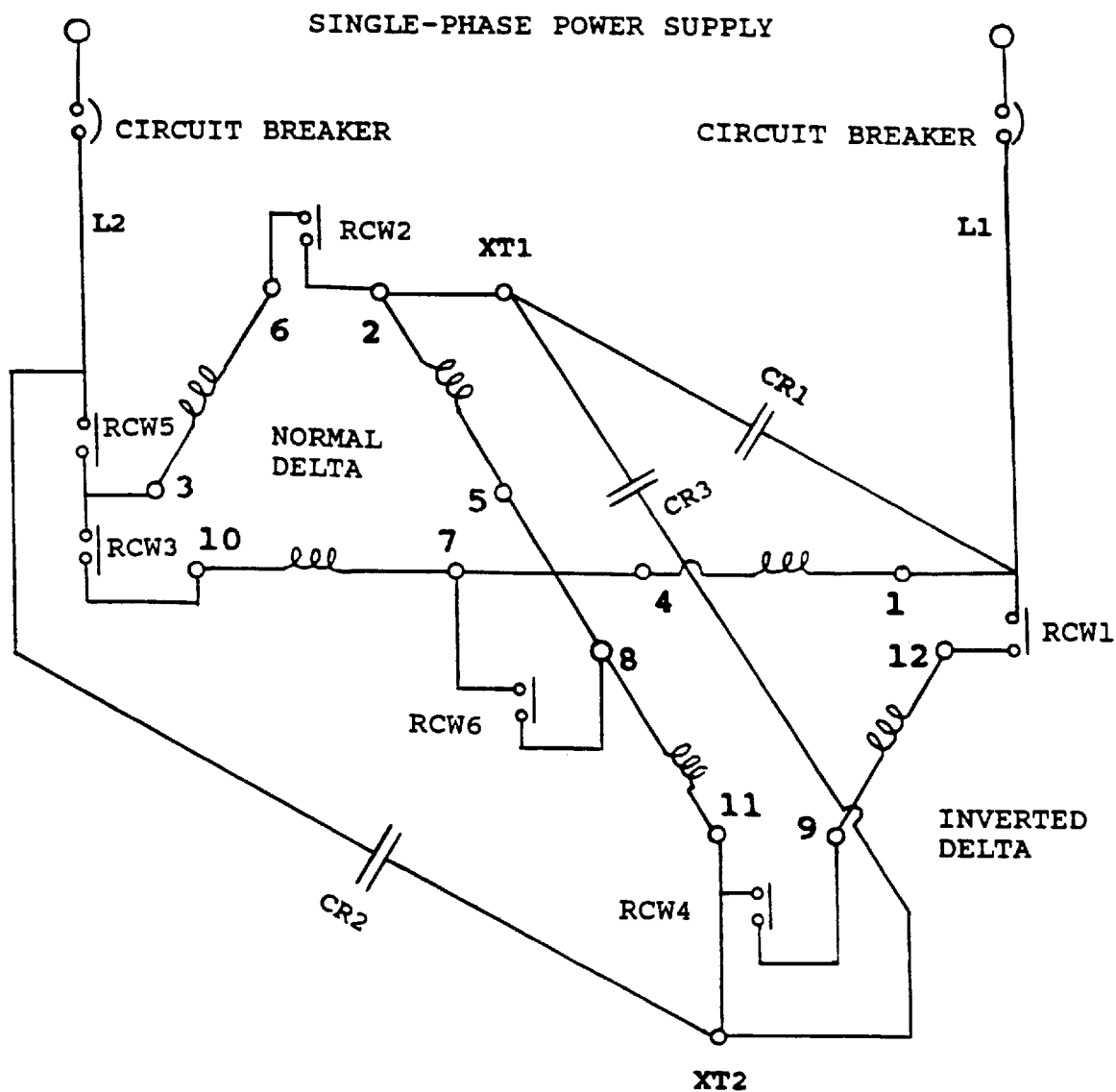
FIG. 1 is a double-delta run connection at full flux and full voltage across a single-phase supply line, with provision for changing the winding connection.

FIG. 1 is the circuit for a delta-wound dual-voltage 3-phase motor connected to run from single-phase at the higher of the two dual voltages.

FIG. 1 is a "DOUBLE-DELTA" run connection of a 6-winding induction motor, for operation from a single-phase power supply. Normally, a commercial induction motor has 3 sets of 6 windings in the form of parallel or series connected pairs for low and high voltage operation. In the present invention, these connections are utilized. A run contactor for the winding connections has a plurality of contacts each marked RCW, which are closed during the run state. The RCW contacts are all open during the starting state. The first motor winding has terminals 1 and 4. The second motor winding has terminals 7 and 10. These two windings are in series, with 4 connected to 7. Line L1 from the single-phase power supply is connected to terminal 1. Line L2 from the single-phase power supply is connected to terminal 10 through two pairs of RCW contacts. The voltage from 1 to 4 is approximately equal to the voltage from 7 to 10, and each is approximately one-half of the supply voltage V.

A third motor winding has terminals 2 and 5; a fourth motor winding has terminals 8 and 11; a fifth motor winding has terminals 3 and 6; a sixth motor winding has terminals 9 and 12. The rotating magnetic field inside of the motor airgap generates voltages in the windings whose geometrical line phasors in the phasor diagram are approximately parallel to the winding circuit angles as drawn in FIG. 1. The phasor voltage from 10 to 1 is in-phase with the power supply reference voltage from L2 to L1. The phasor voltage from 3-to-6 leads the reference voltage by 60°. The phasor voltage 9–12 also leads the reference voltage by 60°. The phasor voltage 2–5 lags the reference voltage by 60°. The phasor voltage 8–11 also lags the reference voltage by 60°. Terminal 5 is connected to terminal 8. 12 is connected to 1 through RCW1. 3 is connected to 10 through RCW3. 11 is connected to 9 through RCW4. 6 is connected to 2 through RCW2. A "DOUBLE-DELTA" circuit with one normal delta and one inverted delta is created by these connections. The connection of 7 to 8 through RCW6 is optional, because the circuits are balanced, and there is essentially no voltage between 7 and 8, and there is essentially no current through the connecting RCW6. However, if the windings are not balanced, there is an advantage in connecting 7 to 8 and making the two delta circuits independent of each other.

The left-side delta with terminals 2, 3 and 5 is a "normal" delta or right-side-up delta. The phase sequence is 5-3-2. On the right side is an "inverted" delta, or "upside-down" delta, with terminals 1, 4 and 11. The phase sequence is 11-4-1. Terminal 2 is also a first external terminal marked XT1. Terminal 11 is also a second external terminal marked XT2.

Three motor-run capacitors in FIG. 1 are marked CR1, CR2 and CR3. These are preferably metallized polypropylene. Capacitor CR1 is connected between L1 and XT1. Capacitor CR2 is connected between L2 and XT2. Capacitor CR3 is connected between XT1 and XT2. These three capacitors inject into XT1 and XT2 the same full-load currents as would occur if the deltas were each connected to individual three-phase sources of voltage V/2.

Consider capacitor CR2. The voltage V2 across CR2 lags the reference voltage by 300 because of the geometry of windings 10-7 and 8-11. The magnitude of this voltage V2 across CR2 is 0.866V, where V is the single-phase supply voltage. The phasor voltage is $$V2=(0.75-j\ 0.433)\ V=0.866\ V \angle -30°.$$

The current through this capacitor leads the voltage drop by 90° and has a phasor angle of +60°. I call this current I30. The current I30 is injected into terminal 11. With respect to an hypothetical 3-phase line, having a neutral N, connected to 11, this current I30 has a power-factor of 0.866 and lags the line-to-neutral voltage 11-to-N by 30°. This current phasor with 60 hertz is $$I30=(377)\ (0.866\ V)\ [CR2]\angle 60°=(377)\ (0.433+j\ 0.75)\ V[CR2],$$

where [CR2] is the magnitude of the capacitance in farads.

Consider capacitor CR3. The voltage V3 across CR3 lags the reference voltage by 60°. The magnitude of this voltage V3 across CR3 is V. The phasor voltage is $$V3=(0.5-j\ 0.866)\ V==V \angle -60°.$$

The current through this capacitor leads the voltage drop by 90° and has a phasor angle of +30°. This current is I60. The current I60 is injected into terminal 11. With respect to a hypothetical 3-phase line, having a neutral N, connected to 11, this current I60 has a power-factor of 0.5 and lags the line-to-neutral voltage 11-to-N by 60°. This current phasor with 60 hertz is $$I60=(377)\ V[CR3]\angle 60°=(377)\ (0.866+j\ 0.5)\ V[CR3],$$

where [CR3] is the magnitude of the capacitance in farads.

The capacitances are designed by selecting the sum of the two currents I30 and I60 to equal a preselected external terminal current, for example, the full-load current.

If this motor were connected as a single delta for a 3-phase supply, the nameplate current would be the 3-phase full-load line current for the higher nameplate voltage. The nameplate current is INP with power-factor PFNP and preselected external injected current at XT2 as IT with the same power-factor PFNP. Then (IT)=(INP). The power-factor angle A in electrical degrees is $$A=\cos^{-1}\ (PFNP).$$

The phasor injected current at XT2 is $$(IT)\angle(90-A)°.$$

The design phasor condition is $$I30+I60=(IT\angle(90-A)°).$$

IT can be resolved into the two current components I30 and I60. The general method for resolving a current into any two components is given subsequently in a paragraph titled NOTES. The solution of this design equation is the resolution of IT into its two components and yields the magnitudes of (I30) and (I60) as:

$$I(30)=2\ (IT)\ \sin\ (60-A)°\ I(60)=2\ (IT)\ \sin\ (A-30)°.$$

From these, the capacitor values are:

$$[CR2]=(I30)/\{(377)\ (0.866)\ V\}\ [CR3]=(I60)/(377\ V)\ [CR1]=[CR2].$$

The current injected into XT1 is the negative of the current into XT2. The −I60 component from CR3 is automatically the negative of I60. The symmetry of CR1 with respect to CR2 when their magnitudes are equal makes the current −I30 into XT1 from CR1 equal to the negative of I30 into XT2.

When the motor shaft power equals nameplate power for which the nameplate current is INP, each motor winding current in FIG. 1 will be the balanced winding current corresponding to this power.

Reduced-Flux Starting Circuits

Figure 2:
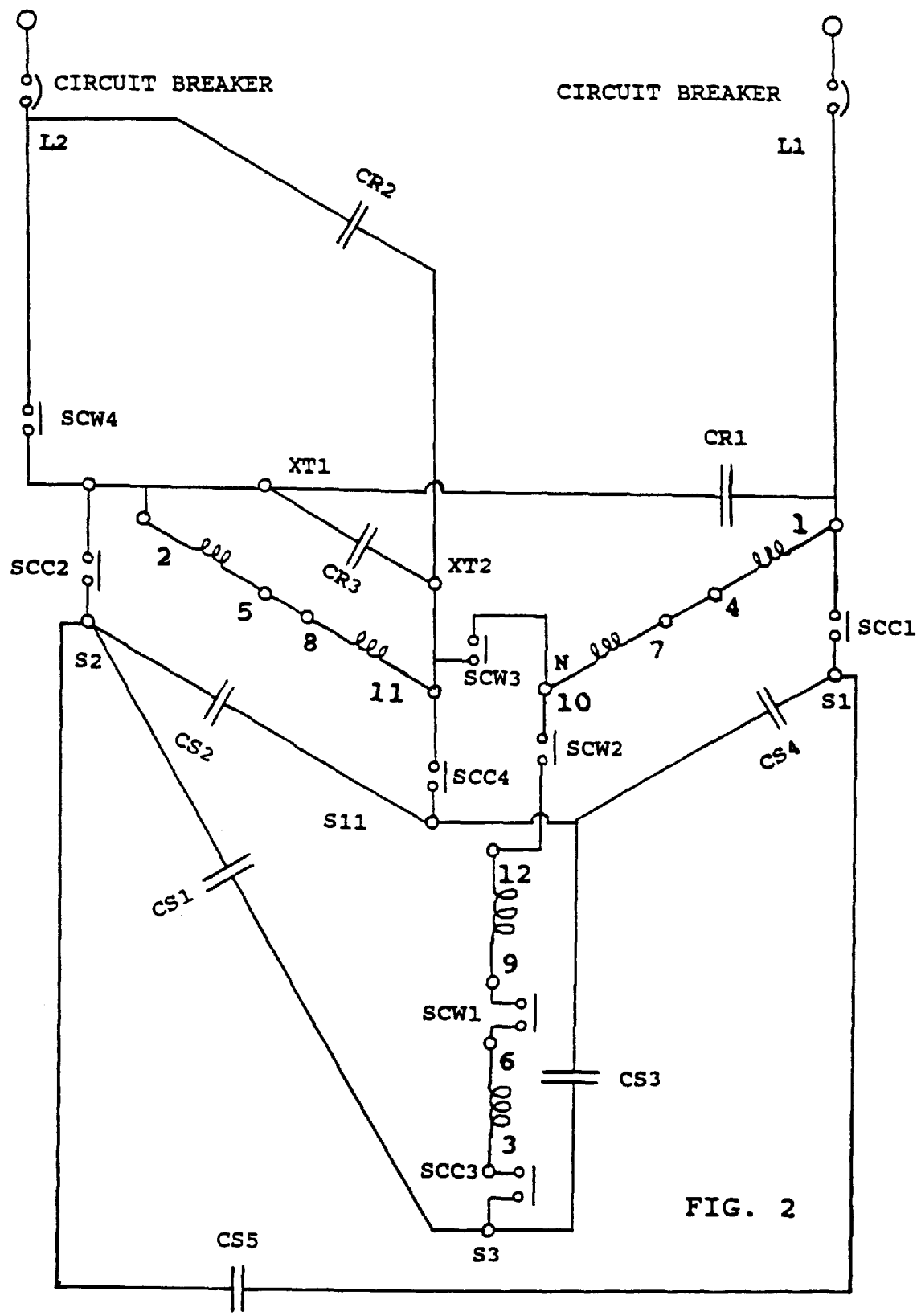
FIG. 2 is a wye-start connection for reduced flux to be used with FIG. 1.

FIG. 2 is the circuit for a delta-wound dual-voltage 3-phase motor reconnected to start from single-phase at the higher of the two dual voltages.

FIG. 2 shows a wye-start connection to be used with the DOUBLE-DELTA motor in FIG. 1. A start contactor SCW to connect the windings in the wye configuration has 4 sets of contacts each marked SCW. A start contactor SCC to connect 4 starting capacitors has 4 sets of contacts each marked SCC. When both of these start contactors are actuated and all eight of the contact sets are closed, and contactor SCW2 is not actuated, the motor is in the wye-start circuit configuration.

The 2-5-8-11 winding is one leg of the wye. The 1-4-7-10 winding is another leg of the wye. 9 is connected to 6 through SCW1, making the series combination winding 3-6-9-12 a third leg of the wye. Supply line L1 is connected to 1. 2 is connected through SCW4 contacts to supply line L2. 10 is connected through one SCW3 to 11 and through another SCW2 to 12 and is the neutral N of the wye. The three winding voltages are 58% of the supply voltage V.

The run capacitor CR1 is permanently connected between L1 and XT1. This helps to advance the phase of the line current and improve the power-factor during starting. The run capacitor CR1 performs the same function as the start capacitor CS5 between S1 and S2. The run capacitor CR2 is permanently connected between L2 and XT2. The run capacitor CR3 is permanently connected between XT1 and XT2. Both of these run capacitors perform the same function as start capacitor CS2 between S2 and S11 during starting.

Electrolytic Starting Capacitors

The starting capacitors are a–c electrolytic capacitors with about a 10% loss factor. The phase angle of a lossy capacitor current with respect to the capacitor voltage lags behind the usual phase angle of 90° by about 5.7°, which is approximated as 6°. There are four start contacts each marked SCC, which form the four terminals for the starting capacitors. These terminals are S1 from 1 through SCC1, S2 from 2 through SCC2, S3 from 3 through SCC3 and S11 from 11 through SCC4. Start capacitor CS1 is connected between S2 and S3. Start capacitor CS2 is connected between S2 and S11. Start capacitor CS3 is connected between S3 and S11. Start capacitor CS4 is connected between S1 and S11. Start capacitor CS5 is connected between S1 and S2. The phasor voltage angle across each capacitor is parallel to the angle of the connecting line as drawn in FIG. 2.

CS1 injects into terminal 3 a current which lags the voltage from 3 to 12 by approximately 66°. This is a 41% power-factor current. CS3 injects also into terminal 3 a current which lags the voltage from 3 to 12 by 96°. This is a −10% power-factor current. These two capacitors are chosen so that the phasor sum of the injected current components equals the locked-rotor phasor current magnitude and phase angle in 3-to-12 at the voltage of 0.58 V. Instead of the locked-rotor current, a different current could be chosen; for example, that current magnitude and phase angle which would produce maximum starting torque at 20% speed during the starting transient.

The design is for locked-rotor current of ILR at winding lag angle ALR. The current through CS1 is I1 at winding lag angle of A1=66°. The current through CS3 is I3 at winding lag angle of A3=96°. The calculation of the resolution of ILR into these two components is $|I1|=2|ILR| \sin (A3-ALR)° \ |I3|=2 \ |ILR| \sin (ALR-A1)°$.

This resolution is for components 30° apart.

$CS1=|I1|/ (377 \ V) \ CS3=|I3|/ ( (377) (0.58) \ V)$.

CS4 is chosen to produce the desired locked-rotor current in winding 1-4-7-10. CS4 will be approximately equal to CS3.

CS2 is chosen to produce the desired locked-rotor current in winding 2-5-8-11. CS2 plus CR2 plus CR3 will be approximately equal to CS3. CS5 and CR1 in parallel will advance the phase of the power line current.

The three wye capacitors CS2, CS3 and CS4 cause three balanced current components of |I3| in the three wye legs. The single capacitor CS1 injecting |I1| through 3-6-9-12 into the wye neutral N causes two additional balanced current components of magnitude |I1| each to flow in the other two wye legs because at the center N of the wye, the three components as phasors add to zero.

The locked-rotor power-line vars will be the difference between all of the capacitive vars and all of the motor magnetizing vars. For many typical motors, this difference is near zero. When it is zero, the power line current will be unity power-factor, and will be the minimum current possible to produce the shaft locked-rotor torque. In this case, capacitor CS5 is zero.

The locked-rotor power delivered by the power supply will be the motor losses plus the lossy starting capacitor losses. The latter watts is approximately one-tenth of the capacitive vars. This minimum current state is an object of this invention.

In the event that the motor vars are larger than the capacitive vars, the additional capacitor CS5 is connected between S1 and S2, to bring the line locked-rotor vars to zero and the line locked-rotor current to unity power factor.

Contactor Controls

Figure 8:
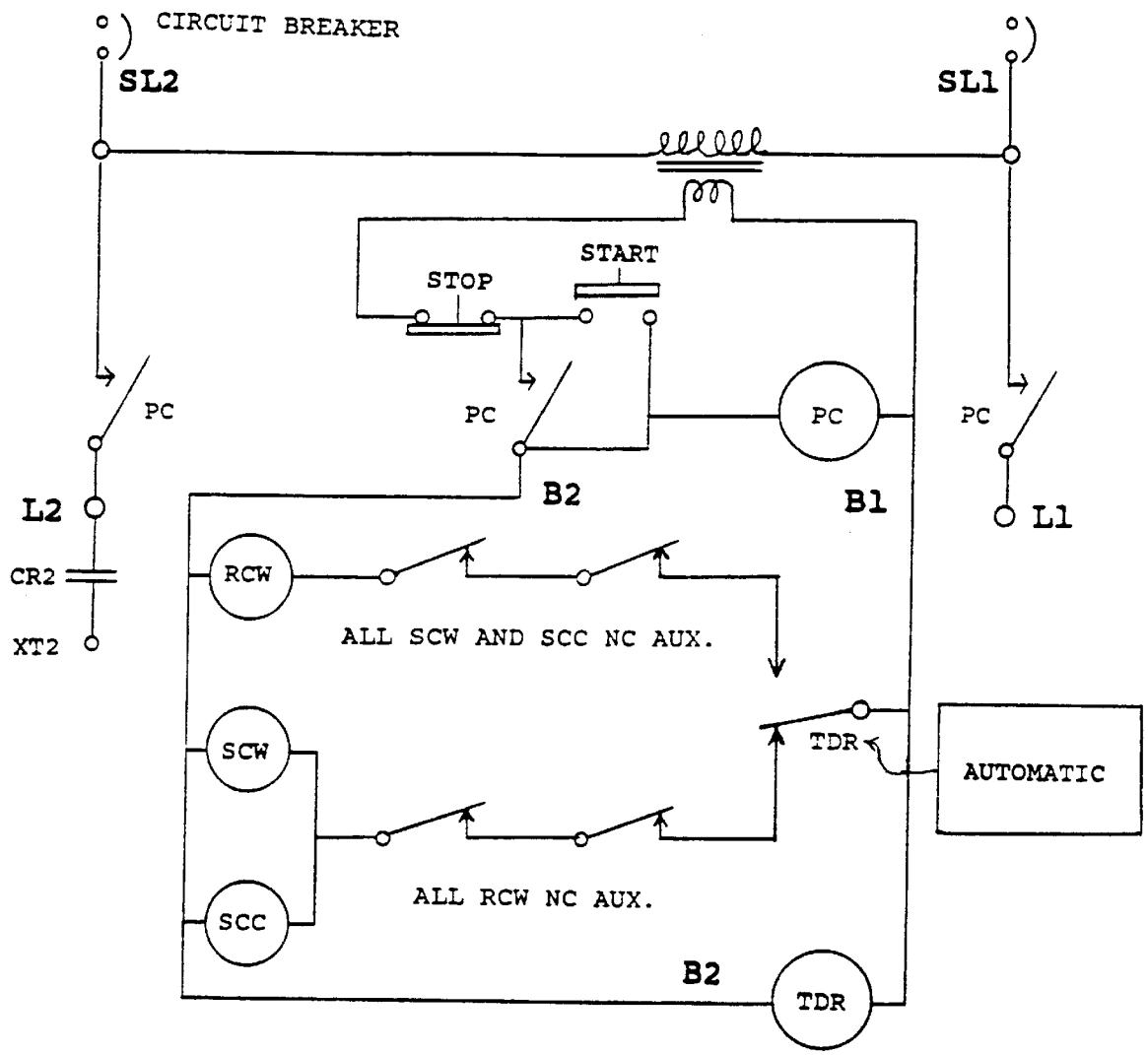
FIG. 8 is a control circuit with time-delay relay to control both the start contactor and the run contactor in FIGS. 2 and 3.

This wye-start connection in FIG. 2 combined with the DOUBLE-DELTA run connection in FIG. 1 results in approximately 58% airgap magnetic starting flux and one-third starting torque. FIG. 8 shows a time-delay relay to actuate the start contactors SCW and SCC in FIG. 2 for a preselected time interval, and then to actuate the run contactors RCW for FIG. 1 thereafter. A detailed description of FIG. 8 will be discussed later.

Alternatively, a shaft speed sensor can be provided and means to actuate the start contactors for zero and low speeds less than a preselected speed, for example, 80% of full-load speed, and deactuate the start contactors and actuate the run contactor for speeds more than a second preselected speed, for example, 75% of full-load speed.

Alternatively, a winding current sensor can be provided and means to actuate the start contactors for the large starting and accelerating currents, and means to deactuate the start contactors and actuate the run contactor for the normal full-load and service-factor loads.

Alternatively, a computer simulation can be provided which calculates the shaft torque or speed from a sensed state vector of winding currents and voltages, and means responsive to said calculation to actuate the start contactors for the large starting and accelerating currents, and means responsive to said calculation to deactuate the start contactors and actuate the run contactor for the normal full-load and service-factor loads, torques and speeds.

All of the foregoing is illustrated in FIG. 8 by the dashed block labeled Automatic.

CS1 provides most of the starting torque. The other capacitors provide most of the magnetic flux. It is possible to have a degenerate system in which only CS1 is used for starting. This will have a larger starting current and a poorer starting power-factor.

In summary, this invention provides a motor with single-phase starting current less than the three-phase starting current; single-phase line starting power-factor is better than the 3-phase line power-factor; single-phase full-load power-factor is better than the three-phase full-load power-factor. The winding start voltages are 57.7% of the run voltages. The soft-start torque is one-third of the locked-rotor torque that would exist with the full voltage applied to the DOUBLE-DELTA.

Wye Starting

This invention provides an induction motor with 6 windings wherein 3 of the windings comprise a delta connection and the other 3 windings comprise an inverted delta connection, the series connection of the delta and the inverted delta is connected across the two lines of a single-phase power supply. The two external winding corners are the two delta corners not connected together and not connected to the supply lines. One run capacitor is connected between one external corner and one line of the power supply and a second run capacitor connected between the other external corner and the other line of the power supply. During a temporary starting interval, the windings are connected in a three-terminal wye which has a wye center, with the power supply lines connected to two of the wye terminals, and a starting capacitor connected between the third wye terminal and one of the supply lines.

There is provided an induction motor as above, with a third run capacitor connected between the two external corners.

There is provided an induction motor as above, with a second starting capacitor connected between the third wye terminal and the center of the wye.

There is provided an induction motor as above, with three additional starting capacitors, one each connected between each of the three wye terminals and the center of the said wye.

There is provided an induction motor as above, with a power-factor correction starting capacitor connected between the the two lines of the power supply.

Semihex (Voltage Phasor Half Hexagon) Starting

Figure 3:
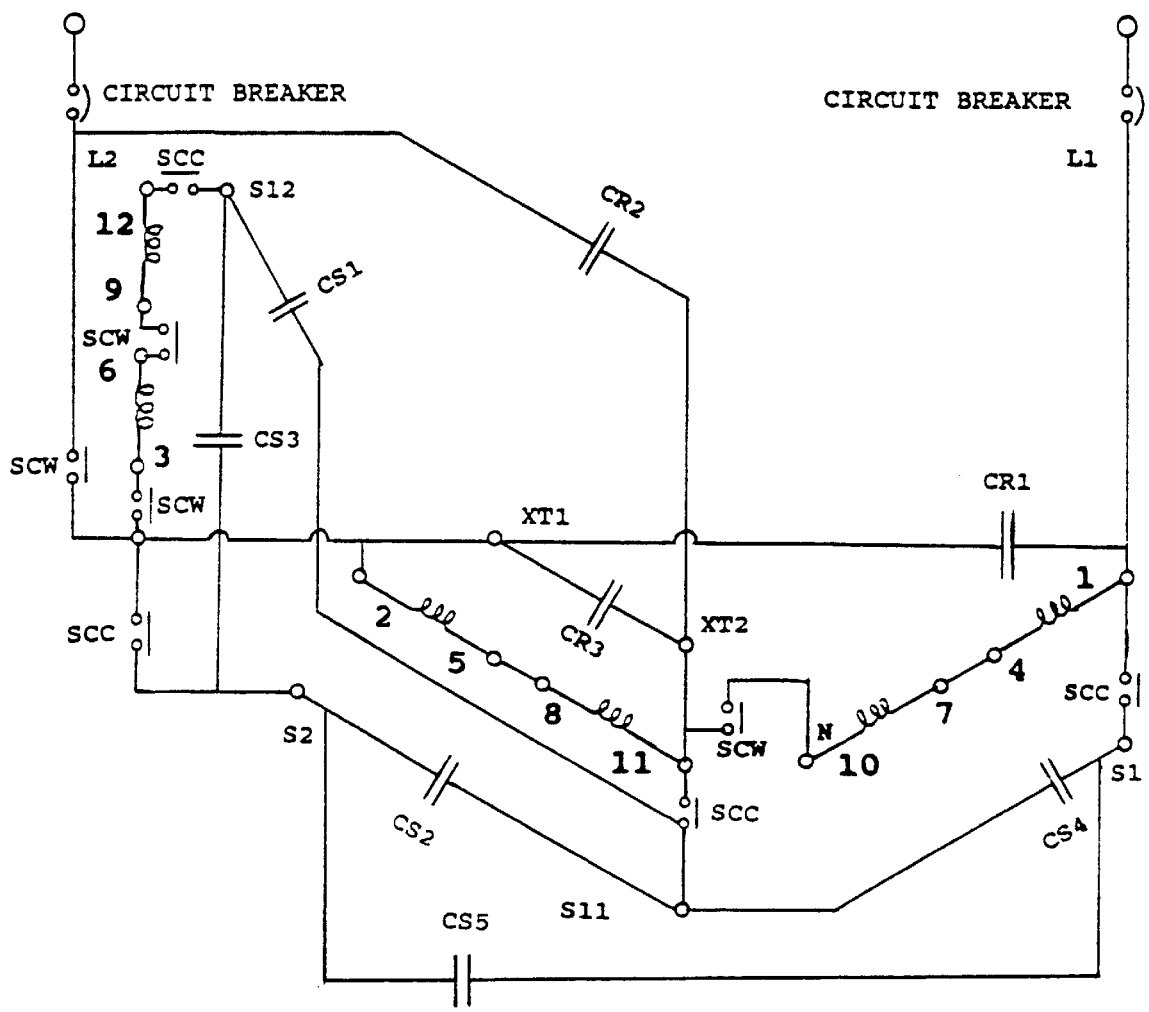
FIG. 3 is a Semihex start connection of reduced flux to be used with FIG. 1.

FIG. 3 is the circuit for a delta-wound dual-voltage 3-phase motor connected to start from single-phase at the higher of the two dual voltages.

FIG. 3 is a starting circuit that can be used instead of FIG. 2 for the DOUBLE-DELTA run circuit in FIG. 1. In FIG. 3, the first four windings with terminals 1, 4, 7, 10, 2, 5, 8, 11 are connected the same as in FIG. 2. The power supply terminals L1 and L2, the external terminals XT1 and XT2, and the run capacitors CR1, CR2 and CR3 are connected the same in FIG. 3 as in FIG. 2.

In FIG. 3, terminal S2 is connected to 2, 1 is connected to S1, 11 is connected to S11, the fifth and sixth windings with terminals 3, 6, 9 and 12 have terminal 3 connected to 2 through contacts SCW, 6 is connected to 9 through contacts SCW, 12 is connected to S12 through contacts SCC, first start capacitor CS1 is connected between S12 and S11, second start capacitor CS2 is connected between S2 and S11, third start capacitor CS3 is connected between S2 and S12, the fourth start capacitor CS4 is connected between S1 and S11, and the fifth start capacitor CS5 is connected between S1 and S2.

In the locked-rotor energized state, the phasor voltages across each of the windings and capacitors are parallel to the lines drawn for the connections for that component on the page. The voltage from 12 to 3 lags the supply reference voltage by 90°. The desired locked-rotor current to be injected into terminal 12 at S12 should lag approximately 165°. The voltage across CS1 is leading 120°. The current component injected by CS1 into 12 is lagging 156°. This current component has a power-factor of 41% with respect to the voltage across winding 12-3. This current lags the winding voltage by 66°, and is designed current I66.

The current component injected by CS3 into 12 is lagging 186° or leading 174°. This current lags the winding voltage by 96°, and is designed current I96. This component has a power-factor of −10% with respect to the voltage across winding 12-3. The voltage across CS1 is the same as the line voltage V. The voltage across CS3 is 0.58 V. The two capacitors are chosen so that the sum of their phasor current components I66 and I96 equals the desired locked-rotor current at the reduced winding voltage of 58% of rated full winding voltage in the delta connection. For balanced currents in the windings, CS4 is approximately the same as CS3. CS2 plus CR2 plus CR3 is approximately the same as CS3.

All of the starting capacitors in FIG. 3 have approximately the same magnitudes as the equivalent start capacitors in FIG. 2. The circuit in FIG. 3 is called a Semihex (voltage phasor half hexagon) start circuit. The Semihex (voltage phasor half hexagon) winding connection, as disclosed in the above '870 patent, connects the 3 windings in series with 120° phase differences as illustrated in FIG. 3.

For most engineering purposes, the performance of the circuit in FIG. 3 equals the performance of the circuit in FIG. 2.

Figure 9:
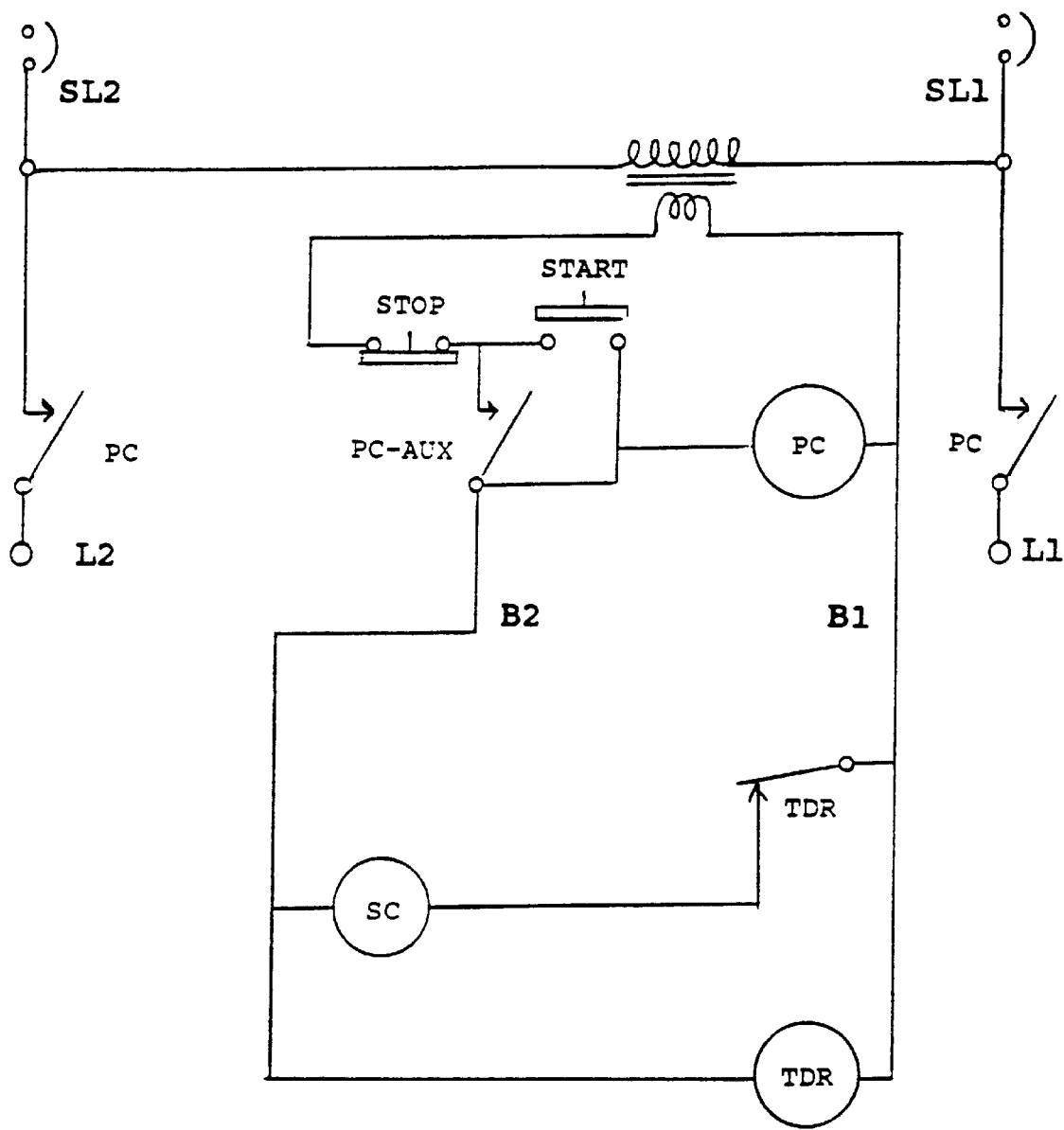
FIG. 9 is a control circuit with time-delay relay to control both the start contactor and the run contactor in FIG. 4.

The contactor control for FIG. 3 is given in FIG. 9.

In summary, I have provided a motor with single-phase starting current less than the three-phase starting current; single-phase line starting power-factor is near to unity power-factor; single-phase full-load power-factor is leading whereas the three-phase full-load power-factor was lagging.

Voltages

In FIG. 1, the three capacitor voltages for CR1, CR2 and CR3 are 0.866 V, 0.866 V and V, respectively. In FIGS. 2 and 3, the respective voltages are V, V and 0.577 V. Therefore all of these capacitors should be chosen for steady-state operation at more than V.

Semihex (Voltage Phasor Half Hexagon) Starting Summary

I have provided an induction motor with 6 windings wherein 3 of the windings comprise a delta connection and the other 3 windings comprise an inverted delta connection. The series connection of the delta and the inverted delta is connected across the two lines of a single-phase power supply. The two external winding corners are the two delta corners not connected together and not connected to the supply lines. One run capacitor is connected between one external corner and one line of the power supply and a second run capacitor is connected between the other external corner and the other line of the power supply. During a temporary starting interval, the windings are connected all in series in a four-terminal semihex circuit, with the power supply lines connected to the first and third terminals in the series sequence, and a starting capacitor connected between the second and fourth terminals in the said series sequence.

I have provided an induction motor as above, with a third run capacitor connected between the two external corners.

I have provided an induction motor as above, with a second starting capacitor connected between the fourth terminal of the series sequence and the third terminal of the series sequence.

I have provided an induction motor as above, with two additional starting capacitors; one additional capacitor connected between the first and second terminals of the series, and a second additional capacitor connected between the second and third terminals of the series.

I have provided an induction motor as above, with a power-factor correction starting capacitor connected between the said two lines of the power supply.

It is within the scope of this invention to achieve the starting interval with a timing current or with a sensor responsive to a winding current, or responsive to a calculated shaft torque, or responsive to a calculated shaft speed, or responsive to a measured shaft speed.

Full-Flux Full-Torque Starting

Figure 4:
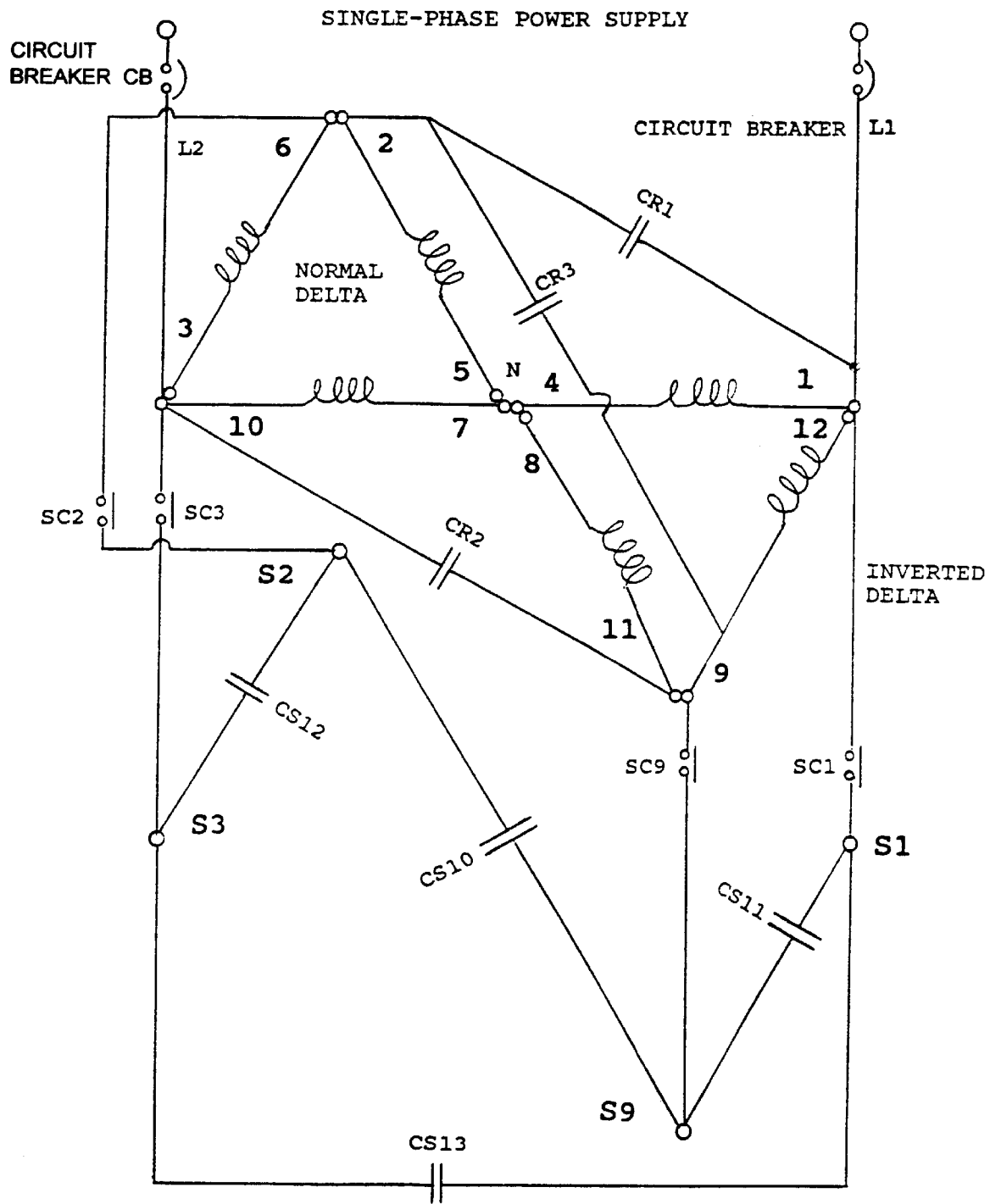
FIG. 4 is a double-delta full-flux full-voltage start connection and run connection.

FIG. 4 is the circuit for a delta-wound dual-voltage 3-phase motor connected to both start and run from single-phase at the higher of the two dual voltages.

FIG. 4 is the circuit for a DOUBLE-DELTA motor with full flux, full torque starting across the single-phase power supply lines. The motor winding connections are the same as FIG. 1 with the RCW contactor closed. The normal half-voltage delta is on the left. The terminal sequence is 3-6-2-5-7-10-3. The inverted half-voltage delta is on the right. The terminal sequence is 1-12-9-11-8-4-1. The winding terminals 1 and 12 are connected to L1. Winding terminals 3 and 10 are connected to L2. Winding terminals 4, 5, 7 and 8 are connected together. Winding terminals 2 and 6 are connected together to form an exterior upper point called a corner terminal. Winding terminals 9 and 11 are connected together to form an exterior lower point also called a corner terminal. Run capacitor CR1 is connected between the upper point and supply line L1. Run capacitor CR2 is connected between the lower point and supply line L2. Run capacitor CR3 is connected between the exterior points.

A starting contactor has four sets of start contacts SC1, SC2, SC3 and SC9. When the contactor is actuated, contacts SC1 connect winding terminal 1 to a terminal S1; contacts SC2 connect winding terminal 2 to S2; contacts SC3 connect terminal 3 to S3; contacts SC9 connect terminal 9 to S9.

Electrolytic starting capacitor CS10 is connected between S2 and S9. Start capacitor CS11 is connected between S1 and S9. Start capacitor CS12 is connected between S2 and S3. Start capacitor CS13 is connected between S1 and S3.

Run Capacitors

The run capacitors in FIG. 4 function the same as the run capacitors in FIG. 1. The 3-phase nameplate full voltage full power current is INP at power-factor PFNP. The power-factor lag angle of the current is $$A = \cos^{-1}(PFNP).$$

At full load, each winding carries (INP)/(1.732) amperes. At a terminal of a delta, the phasor sum of the two winding currents for the terminal connection is (INP). At full-load run in FIG. 4, the run current that is injected into the lower point 9 and 11 by CR2 and CR3 has (INP) magnitude and phase lag angle A with respect to a 90° reference voltage.

$$|I30| = 2 \,(INP)\, \sin(60-A)° \quad |I60| = 2\,(INP)\, \sin(A-30)°.$$

For 60 hertz, $$CR2 = |I30|/\{(377)(0.866\,V)\} = (1.155)\,|I30|/(377\,V) \quad CR3 = |I60|/(377\,V) \quad CR1 = CR2.$$

When CR1 equals CR2, CR1 delivers the same $|I30|$. At full-load in FIG. 4, the run current that is injected into the upper point 2 and 6 by CR1 and CR3 has (INP) magnitude and phase lag angle A with respect to a −90° reference voltage.

Locked-Rotor Currents

The 3-phase full-voltage locked-rotor phasor current is (ILR). (IX) is the phasor starting current injected into the lower point at S9, which is the phasor (INP) minus the phasor (ILR). As phasors, $$(IX) = (ILR) - (INP) = |IX| \angle AX°,$$

where AX° is the lag angle of the injected current component into S9 from the starting capacitors. The injected components are I10 from CS10 and I11 from CS11. These two components are 60° apart, not 30° as in the previous embodiments. I10 has a lag angle with respect to the vertical reference of 66°. I11 has a lag angle with respect to the vertical reference of 126°.

The resolution of (IX) into the two components I10 and I11 is $$I10 = (IX)\sin(126-A)/\sin(60) = (1.155)(IX)\sin(126-A), \text{ and } I11$$
$$\text{is } I11 = (IX)\sin(A-66)/\sin(60) = (1.155)(IX)\sin(A-66).$$

The capacitive impedances in ohms are Z10 and Z11 for C10 and C11, respectively.

$$Z10 = V/(I10) \quad Z11 = (0.5\,V)/(I11).$$

The capacitive reactance is almost equal to the impedance for these lossy capacitors. For capacitance, $$CS10 = 1/\{(377)(Z10)\} = (I10)/(377\,V) \quad CS11 = 1/\{(377)(Z11)\} = 2\,(I11)/(377\,V).$$

Because of symmetry, $$CS12 = CS11.$$

Locked-Rotor Starting Vars

The starting capacitor locked-rotor leading vars is $$VARCS = (I10)\,V + (I11)\,V = (|I10| + |I11|)\,V.$$

There is an additional capacitor power loss PC watts which adds to the power that is drawn from the single-phase supply.

$$PC = (VARCS)/10.$$

The run capacitor vars on starting are $$VARCR = 2(I30)(0.866\,V) + (I60)\,V = \{(1.732)(I30) + (I60)\}\,V.$$

The total leading capacitive vars is $$VARC = VARCS + VARCR = \{1.732(I30) + (I60) + |I10| + |I11|\}\,V.$$

The locked-rotor winding lagging power-factor is PFLR and delta-point current is ILR. The locked-rotor total winding magnetic lagging vars is $$VARW = (1.732)(ILR)\,V\,\sin\cos^{-1}(PFLR).$$

Without capacitor CS13, the net locked-rotor leading vars is $$NETVAR = VARC - VARW.$$

When NETVAR is positive, the locked-rotor starting current in the power lines has a leading power-factor. No CS13 would be used.

When NETVAR is negative, the locked-rotor starting current in the power supply is brought to unity power-factor by adding the vars from CS13, so that $$I13 = |NETVAR|/V.$$

$$CS13 = (I13)/(377\,V).$$

The starting contactor, SC, for contacts SC1, SC2, SC3 and SC9 is actuated for a temporary starting interval as shown in FIG. 9.

In summary, I have provided a motor with single-phase starting current less than the three-phase starting current; single-phase line starting power-factor is near to unity power-factor; single-phase full-load power-factor is leading whereas the three-phase full-load power-factor is lagging.

I have provided an induction motor with 6 windings wherein 3 of the windings comprise a delta connection and the other 3 windings comprise an inverted delta connection.

The series connection of the delta and the inverted delta is connected across the two lines of a single-phase power supply. The two external corners created are the two delta corners not connected together and not connected to the supply lines. One run capacitor is connected between one said external corner and one supply line, another run capacitor is connected between the other said external corner and the other supply line. Means temporarily connect and disconnect a starting capacitor between the external corners.

I have provided an induction motor as above, with a third run capacitor connected between said external corners.

I have provided an induction motor as above, with two additional starting capacitors, said means temporarily connecting one additional capacitor between one external corner and one of the supply lines, and said means temporarily connecting the other additional capacitor between the other external corner and the other one of the supply lines.

I have provided an induction motor as above, with a power-factor-correction capacitor, and means temporarily connecting the power-factor-correction capacitor between the two supply lines.

It is within the scope of this invention to provide means to connect and disconnect a starting capacitor responsive to a timing relay, or responsive to measured shaft speed, or responsive to computed shaft speed from a measured state variable of winding voltages and currents, or responsive to computed shaft torque.

Semihex (Voltage Phasor Half Hexagon) Run Connection

Figure 6:
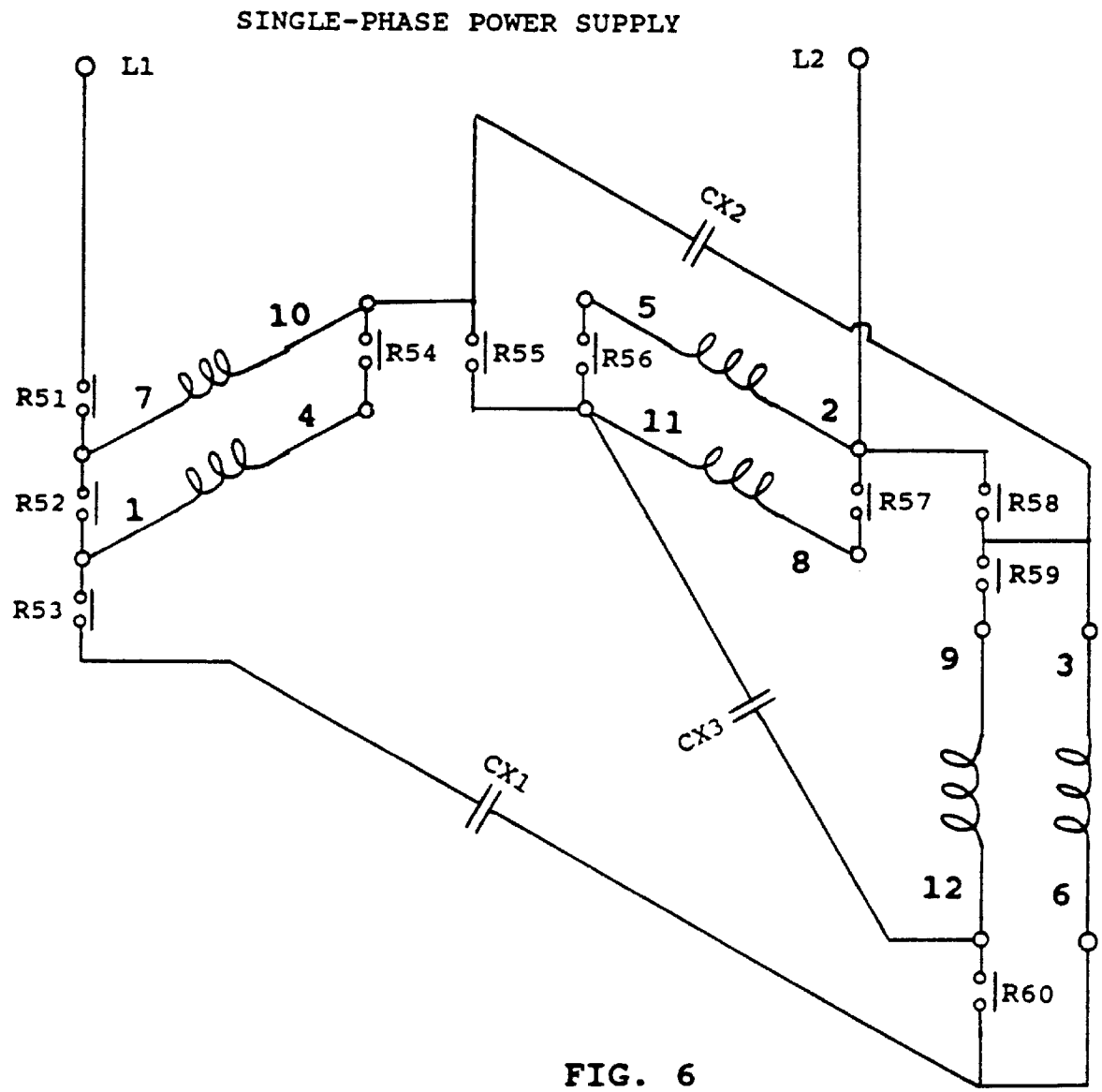
FIG. 6 is a Semihex voltage phasor half hexagon run connection for single-phase, with provision for changing the winding connection.

FIG. 6 is the circuit for a wye-wound dual-voltage 3-phase motor connected to run from single-phase at the lower of the two dual voltages.

FIG. 6 is the circuit for the connection of the 6 windings of an induction motor whose usual designation is a dual-voltage wye-wound motor. The line voltage V between L1 and L2 is the lower of the two dual voltages. The winding voltages are all 0.58 V. Pairs of windings are connected in parallel for this lower voltage, as is common for a wye-wound motor. The winding terminal designations in FIG. 6 are the standard for USA motors. Terminal 2 is connected to line L2 of the single-phase supply.

To permit reconnecting the windings for starting purposes, run contactors R are provided, which for the run mode, close all of the run contacts R51 through R60 inclusive in FIG. 6. Contacts R51 and R52 connect 1 and 7 to L1. Contacts R54, R55 and R56 connect 4, 5, 10 and 11 together. Contacts R57, R58 and R59 connect 2, 3, 8 and 9 together. Contacts R60 connect 6 and 12 together.

One terminal of run capacitor CX1 is connected by R53 to 1 and the other terminal is connected to 6 and by R60 to 12. Run capacitor CX2 is connected between 3 and 10. Run capacitor CX3 is connected between 11 and 12.

The parallel connection of windings 1–4 and 7–10 makes a single phase with winding terminals 1 and 10. The parallel connection of windings 2–5 and 8–11 makes another phase with winding terminals 2 and 11. The parallel connection of windings 3–6 and 9–12 makes a third phase with winding terminals 3 and 12.

When all of these contacts are closed, the winding configuration is a Semihex, with the power supply across the series combination of 1–10 and 2–11. The rotating magnetic flux field in the airgap due to these two phases generates in winding 3–12 a voltage from 3 to 12 approximately 90° lagging the voltage from L1 to L2. 3-12 is the driven winding with the driven terminal 12.

Capacitor CX1 injects a current into 12, whose phasor phase lags the winding voltage from 12 to 3 by 30°. Denote this injected current I30. Capacitor CX3 injects a current into 12, whose phasor phase lags the winding voltage from 12 to 3 by 60°. Denote this injected current I60. The phasor sum of these two currents is the desired full-load winding current IFL, which is the higher of the two nameplate currents for the lower of the two dual voltages. The IFL phasor angle A lags the winding voltage by $$A = \cos^{-1}(\text{PFNP}).$$

Given this latter, the decomposition of IFL into its two components is $$I30 = 2\,(|IFL|)\,\sin\,(60\text{-}A)° \quad I60 = 2\,(|IFL|)\,\sin\,(A\text{-}30)°.$$

The voltage across CX1 is 1.155 V. The voltage across CX3 is V. For 60 hertz, the capacitances in farads are:

$$CX1 = (I30) / \{(377)(1.155\,V)\} \quad CX3 = (I60) / (377\,V)$$

CX2 should also carry the same (I30) with only 0.577 V, which is half of the voltage across CX1, so capacitance CX2 should be double CX1.

$$CX2 = 2\,(CX1).$$

Delta Start Connection

Figure 7:
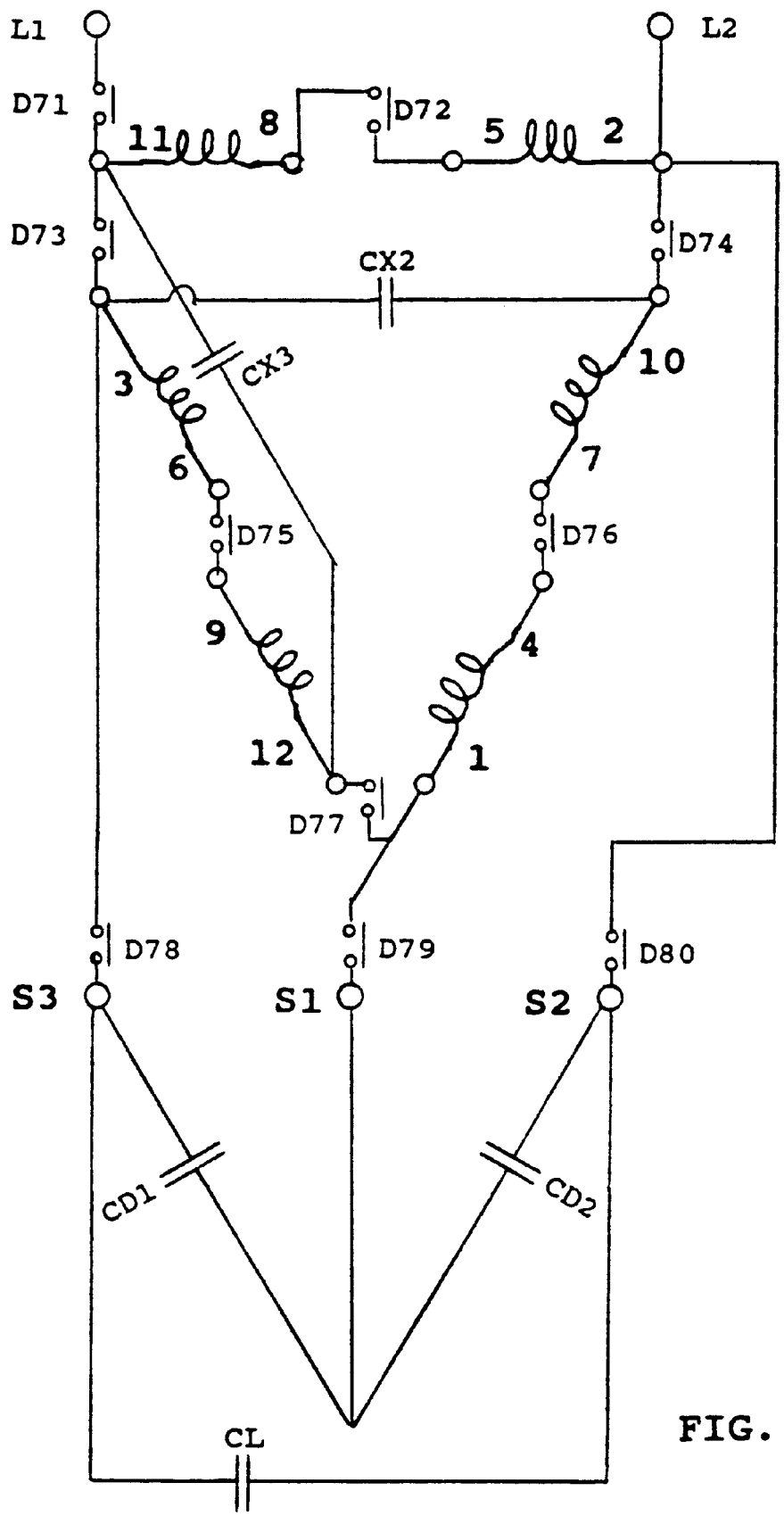
FIG. 7 is a reduced-flux delta connection, to be used with FIG. 6.

FIG. 7 is the circuit for a wye-wound dual-voltage 3-phase motor connected as a delta to start from single-phase at the lower of the two dual voltages.

FIG. 7 shows a reduced-flux delta connection for FIG. 6, when the run contactor R is not actuated and all run contacts R51 through R60 are open. Delta start contactor D has contacts D72 which connect 5 to 8. Contacts D75 connect 6 to 9; contacts D76 connect 4 to 7; contacts D73 connect 3 to 11; contacts D74 connect 2 to 10; contacts D77 connect 1 to 12; the latter three contacts close the three points of the delta. Contacts D71 connect L1 to 11 and apply line voltage across 11 to 2 and across 3 to 10.

Windings 2–5 and 8–11 are in series in FIG. 7, and each receives half voltage V/2. In FIG. 6, for the run mode, this pair of windings were in parallel, and each received a voltage of 0.577 V. This latter voltage produced full airgap flux. The lower winding voltage of V/2 in FIG. 7 is 86.6% of the full winding voltage in FIG. 6. The airgap flux is proportional to the voltage, and the flux in FIG. 7 has been reduced to approximately 86.6% of its value in FIG. 6.

Windings 1–4 and 7–10 are in series in FIG. 7 for the start mode. They were in parallel in FIG. 6 for the run mode. Windings 3–6 and 9–12 are in series in FIG. 7 for the start mode. They were in parallel in FIG. 6 for the run mode.

The delta start contactor D has contacts D78 which connect 3 to S3, contacts D79 which connect 1 to S1, and contacts D80 which connect 2 to S2. These three sets connect the start capacitor bank which consists of capacitor CD1 connected between S1 and S3, capacitor CD2 connected between S1 and S2, and capacitor CL connected between S2 and S3. The 2 and 3 terminals are connected to L2 and L1, respectively, so they are energized with the line voltage V.

At locked-rotor starting, terminal 1 has a supply of current from S1 from start capacitors CD1 and CD2. The start capacitor CD1 from S3 to S1 delivers a current I66 into S1 which lags 66° from the vertical reference voltage from 1 to a hypothetical center of the delta or to 5 or to 8. The start capacitor CD2 from S2 to S1 delivers a current I126 into S1 which lags 126° from the vertical reference voltage from 1 to a hypothetical center of the delta or 5. A third current is also injected into 1 from the run capacitor CX3, which current lags the vertical reference voltage by 60° and has the magnitude (I60). The sum of these three currents at 1 is the preselected locked-rotor current ILR at power-factor lag angle ALR for the reduced voltage. In this case, the winding currents will be balanced in magnitude and phase, and the airgap flux will be uniform and rotating synchronously. The delta windings will have symmetrical balanced voltages.

With a FIG. 7 reduced flux of 86.6% and a reduced winding current of 86.6%, the airgap locked-rotor torque is reduced to 75% of what it would have been if FIG. 6 had been used for starting.

The motor equivalent circuit at locked-rotor is a linear constant impedance circuit. The locked-rotor current is proportional to the applied voltage. FIG. 6 is a lower-voltage wye for running. The catalog locked-rotor line current is (ILRY). The winding locked-rotor current at full voltage is (ILRY)/2. Each winding voltage is 0.577 V. The apparent impedance is Z=0.577 V/(ILRY/2)=1.55 V/(ILRY).

The locked-rotor full-voltage input power is (ILRY) (1.732)V cos (ALR), where cos (ALR) is the locked-rotor power-factor and (ALR) is the phase angle of the current lagging the voltage. The delta winding voltage reduction in FIG. 7 is to 86.6%. The current reduction is also to 86.6%. The power reduction is to 75%. The reduced-voltage input power in FIG. 7 is (1.3) (ILRY)V cos (ALR). The capacitor CL adjusts the line current to unity power factor. The single-phase line current in FIG. 7 is then (1.3)(ILRY) cos (ALR).

In FIG. 7, the winding currents are 0.866(ILRY)/2=0.433 (ILRY). This current magnitude flows through windings 1–4 and 12–9 at the bottom corner in FIG. 7. The "corner" current considering this as a three-phase delta is ILR= (1.732) (0.433) (ILRY)=0.75 (ILRY). This is the current that should be injected by the three capacitors CD1, CD2 and CX3 through D79 and D77. The power-factor and phase angle are approximately unchanged by change in winding voltage at the locked-rotor state.

The current injected at S1 from the starting capacitors is ID. This current ID is the locked-rotor current ILR minus the current IX3 from CX3.

Phasor $(ILR)=(ILR) \{\sin(ALR)+j\cos(ALR)\}$ $(IX3)=(CX3) (377 V)=(I60)\angle 30°$ Phasor $(IX3)=(I60) (0.866+j\ 0.5)$ Phasor $(ID)=\{(ILR)\sin(ALR)-0.866(I60)\}+j\{(ILR)\cos(ALR)-0.50(I60)\}$ Phasor $(ID)=|IDR|+j |IDI|=|ID|\angle \tan^{-1}(|IDI|/|IDR|)\ |ID|^2=|IDR|^2+|IDI|^2$ The magnitude of |ID| is determined from the above. The phase lag angle AD of the driven current into S1 is $AD=\tan^{-1}\{(ILR)\sin(ALR)-0.866(I60)\}/\{(ILR)\cos(ALR)-0.50(I60)\}$ The sum of I66 and I126 equals the driven current ID. The resolution of ID into these two components 60° apart is:

$I66=(ID)\sin(126-(AD))/\sin(60)=(1.155)(ID)\sin(126-AD)$.
$I126=(ID)\sin(AD-66)/\sin(60)=(1.155)(ID)\sin(AD-66)$.

Both capacitors have voltage V. At 60 hertz, the capacitances are

CD1=I66 / (377 V). CD2=I126 / (377 V).

Reactive Vars

Run capacitor CX2 is permanently connected between 3 and 10. On starting, this is between L1 and L2, and the capacitor current improves the line power-factor. During starting, the current IX2 is (1.732) (I30) amperes, because the voltage is higher than in FIG. 6. Run capacitor CX3 is permanently connected between 11 and 12, so that in the start configuration, CX3 has the same voltage as in FIG. 6, and carries the same magnitude of current also lagging 60° at 12.

The run capacitor vars during starting are $RUNVAR=(1.732) (I30) V+(I60) V$.

Not considering CL, the start capacitor reactive vars are $STARTVAR=(I66) V+(I126) V$.

The total capacitive leading vars is $VARC=RUNVAR+STARTVAR=\{(1.732)(I30)+(I60)+(I66)+(I126)\}V$.

The motor delta winding lagging vars with reduced voltage is $VARM=1.732 (ILR) V \sin(ALR)$.

The net leading vars on the power line are $NETVAR=VARC-VARM$.

When the NETVAR is positive, no CL is used. The starting line power-factor is leading.

When the NETVAR is negative, CL is added to bring the line current to unity power-factor.

$|ICL|=|NETVAR|/V.\ CL=|ICL|/(377\ V)=|NETVAR|/((377)\ V^2)$.

With CL, the locked-rotor current is unity power-factor. This is the least starting current for the reduced-flux starting torque.

Alternative Controls

Figure 10:
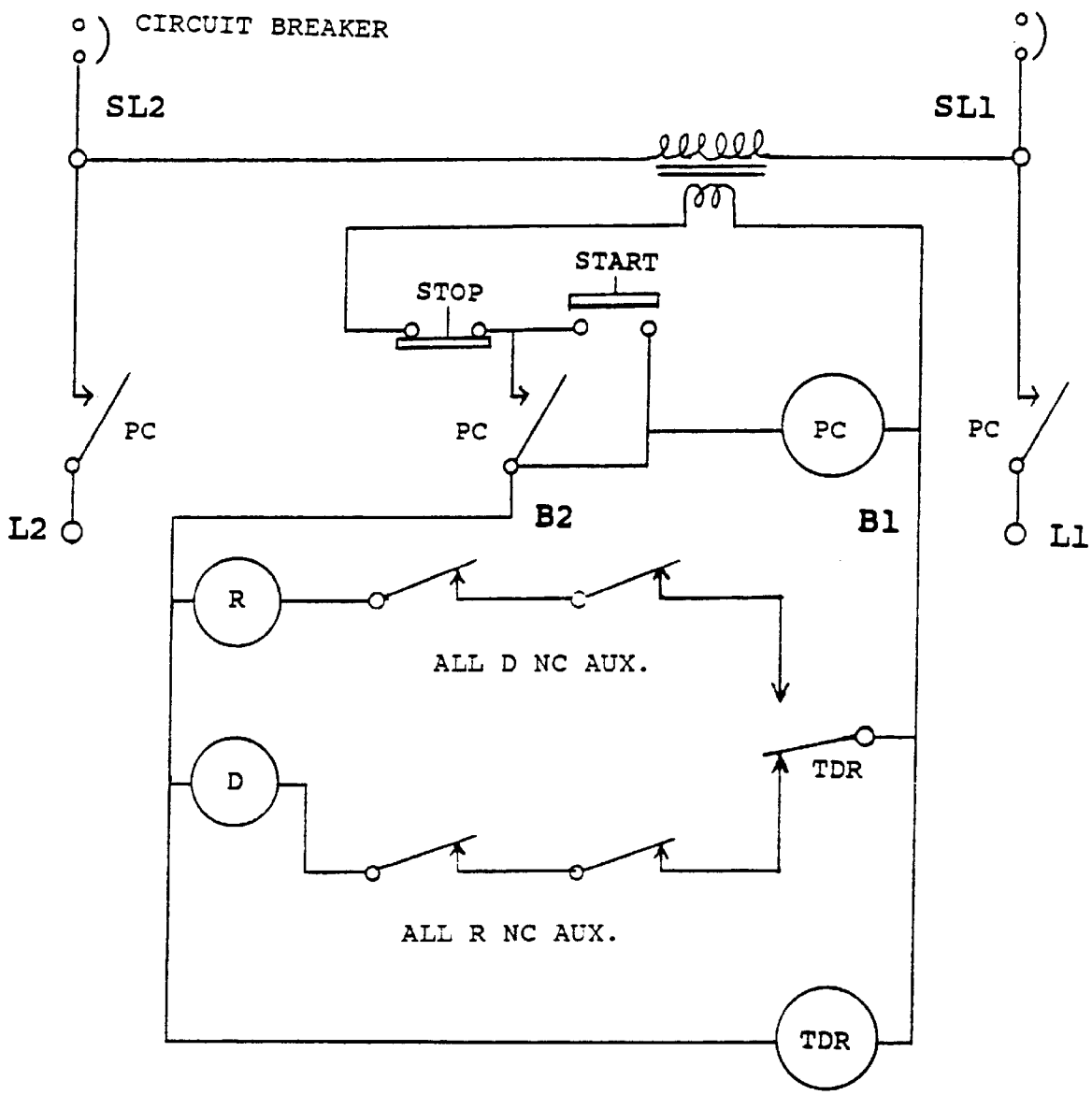
FIG. 10 is a control circuit with time-delay relay to control start and run contactors in FIGS. 6 and 7.

The start contactor D in FIG. 7 and the run contactor R in FIG. 6 can be controlled by a time delay relay (TDR) as shown in FIG. 10. Alternatively, a speed-sensing centrifugal switch mounted on the motor shaft can control the close of contactor D for low speeds, and control the opening of contactor D and the close of contactor R for speeds above a preselected speed. The foregoing is illustrated in FIG. 8 by the dashed block labeled Automatic.

Alternatively, the start and run contactors in FIGS. 1 through 4 and FIGS. 6 and 7 can be responsive to the motor winding currents. A relay responsive to a current sensor in winding 2–5 in FIG. 7, for example, can close start contactor S for the large initial starting current, and can open contactor S and close contactor R in FIG. 6 for the smaller normal load currents.

In FIG. 3, a relay responsive to the current in winding 1–4 can close the contactors SCC and SCW for the large initial starting current, and can open these two contactors and close contactor RCW in FIG. 1 for the smaller normal load currents.

In summary, I have provided a soft-start delta connection for a full-voltage Semihex (voltage phasor half hexagon) run connection of an induction motor on single-phase with unity-power-factor locked-rotor line current. This is the least line current for the 75% locked-rotor torque.

I have provided an induction motor with a delta winding configuration starting connection. Two lines from a single-phase power supply are connected to two corners of the delta. A temporarily connected starting capacitor is between a third corner of said delta and one of the lines. Means for a run condition reconnect the motor windings into a series connection of three windings with four terminals. For convenience, the series Semihex connection of the 3 windings at 120° phase differences may be denominated with terminals 1, 2, 3 and 4 (these do not correspond with FIGS. 6 and 7). The terminals have a voltage between terminals 1 and 3 which is larger than the voltage between terminals 1 and 2 and larger than the voltage between terminals 2 and 3. The voltage between terminals 2 and 4 is larger than the voltage between terminals 2 and 3 and larger than the voltage between terminals 3 and 4. The voltage between terminals 1 and 4 is larger than the voltage between terminals 1 and 2. Means connect the lines to terminals 1 and 3 in said series, connect a first run capacitor between terminals 1 and 4 in the series, and connect a second run capacitor between terminals 2 and 3 in said series.

I have provided an induction motor as above, with a third run capacitor connected between terminals 2 and 4 in said series.

I have provided an induction motor as above, with a second temporarily connected starting capacitor between said third corner and the other of said lines.

I have provided an induction motor as above, with a third temporarily connected starting capacitor between said lines.

I have provided an induction motor as above, wherein said means for reconnecting the motor windings is responsive to a start contactor which disconnects the said delta configuration at the end of a preselected time interval.

I have provided an induction motor as above, wherein the means for reconnecting the motor windings is responsive to a run contactor which connects the windings in series at the end of a preselected time interval.

I have provided an induction motor as above, wherein the means for reconnecting the motor windings is responsive to a start contactor which disconnects the delta configuration responsive to the motor shaft speed.

I have provided an induction motor as above, wherein the means for reconnecting the motor windings is responsive to a run contactor which connects the windings in series responsive to the motor shaft speed.

Controls

FIG. 8 is the circuit for the control of the contactor RCW in FIG. 1 and the contactors SCW and SCC in FIG. 2. In FIG. 8, the transformer provides a secondary voltage across the normally-closed stop button, the normally open start button, and the power contactor PC coil. When the start button is pressed, the transformer secondary voltage is applied to the PC coil, and the power contactor "pulls up," closing the three PC contacts. One of these contacts is in parallel with the start button contacts. When the PC contact closes, the PC coil "locks up," remaining energized after the start button is released. This applies voltage continuously to the bus pair B1 and B2. Initially, the normally-closed NC contact of TDR energizes the winding contactor SCW coil and the capacitive contactor SCC coil and both are actuated and pull up.

The power contactor PC connects the power supply line SL1 to L1 and winding terminal 1 and connects supply line SL2 to L2 and through CR2 to XT2 in FIG. 2. SCW4 in FIG. 2 connects L2 to 2 and XT1. This completes the starting winding connection in FIG. 2.

The time-delay relay TDR is connected across B1 and B2 and begins to time. After a set interval, TDR opens its NC contact and closes its normally-open NO contact. The coils of contactors SCW and SCC are deactivated and the armatures "fall back," and run contactor coil RCW is activated and its armature "pulls up." All of the contacts in FIG. 2 are opened, and all of the RCW contacts in FIG. 1 are closed. Thereafter, the motor is in the normal run state.

When the stop button in FIG. 8 is pressed, the voltage is removed from B1 and B2, and the power contactor PC and the run contactor RCW both "fall back," leaving the motor unenergized. The motor will coast to a stop.

In the event that there is a power failure during normal operation, the loss of voltage on the transformer does the same thing as pressing the stop button. The motor is disconnected and coasts to a stop. With this control, the motor must be manually restarted.

It is within the scope of this invention to have the stop and start contacts remotely controlled by telephone signals, or by a computer, or by an automatic restart system, responsive to the applied voltage.

In FIG. 8, there are provided auxiliary normally-closed NC contacts on all of the contactors. For starting, all of the RCW contactors must be in their normal unenergized (open) positions for the NC AUX to be closed and for the NC contacts of TDR to energize the start contactor coils. This prevents any portion of the circuit of FIG. 1 to be superimposed on the circuit of FIG. 2.

For running, all of the SCW and SCC contactors must be in their normal unenergized (open) positions for the SCW AUX and SCC AUX to be closed and for the NO contacts of TDR to energize the run contactor RCW coil. These auxiliary contacts provide a safety interlock so that a mechanical interlock is not necessary.

FIG. 8 is also the control circuit for FIG. 3. Initially, all of the SCW and SCC contacts in FIG. 3 are closed, and the motor is in the start mode.

After the preset time of the time-delay relay TDR all SCW and SCC contacts are opened in FIG. 3, and all of the RCW contacts are closed in FIG. 1 for the run mode.

FIG. 9 is the circuit for the control of the motor in FIG. 4. When the start button is pressed, power contactor PC is actuated, and the PC-AUX auxiliary contact "locks up" the armature of PC. The power contacts of PC connect SL1 to L1 and SL2 to L2. In FIG. 4, terminals 1 and 3 are permanently connected to L1 and L2, respectively. Bus voltage B1–B2 through the NC contact of TDR energizes the coil of SC, causing all of the SC contacts in FIG. 4 to close. The motor is in the energized start mode. After the preset time of the time-delay relay TDR, the NC contacts of TDR open, removing the voltage on the coil of SC, and causing all of the SC contacts in FIG. 4 to open. The motor is then in the normal run mode.

FIG. 10 is the circuit for the control of the motor in FIGS. 6 and 7. When B1 and B2 are energized, initially the coil for the delta contactor D is energized, and all of the contacts in FIG. 7 are closed, connecting the motor in the delta D circuit for the start mode. The PC contactor connects line terminals SL1 and SL2 to the terminals L1 and L2, respectively. L2 is permanently connected to 2. L1 is connected through D71 to 11 and energizes the motor windings for the start mode.

When TDR has finished its preset time interval, the NC contact is opened and the NO contact is closed, energizing the contactor R coil. All of the contacts in FIG. 7 are opened, and all of the contacts in FIG. 6 are closed. This connects the windings in the Semihex configuration for the run mode.

Solid-State Relays

It is within the scope of this invention to use electronic devices to accomplish the closing and opening of the electrical circuits shown as contactor contacts.

It is within the scope of this invention to use solid-state relays for any of the contact sets in FIGS. 1, 2, 3, 4, 6 or 7.

It is within the scope of this invention to use any method of closing and opening the electrical conduction of the contacts shown in FIGS. 1 through 4 and FIGS. 6 and 7 including manually closing the electrical contacts, and including using hydraulically or pneumatically powered switches.

Is is within the scope of this invention for me to use vacuum switches or gas-discharge tubes for the electrical contacts in the figures.

DOUBLE-DELTA Run Connection

Figure 11:
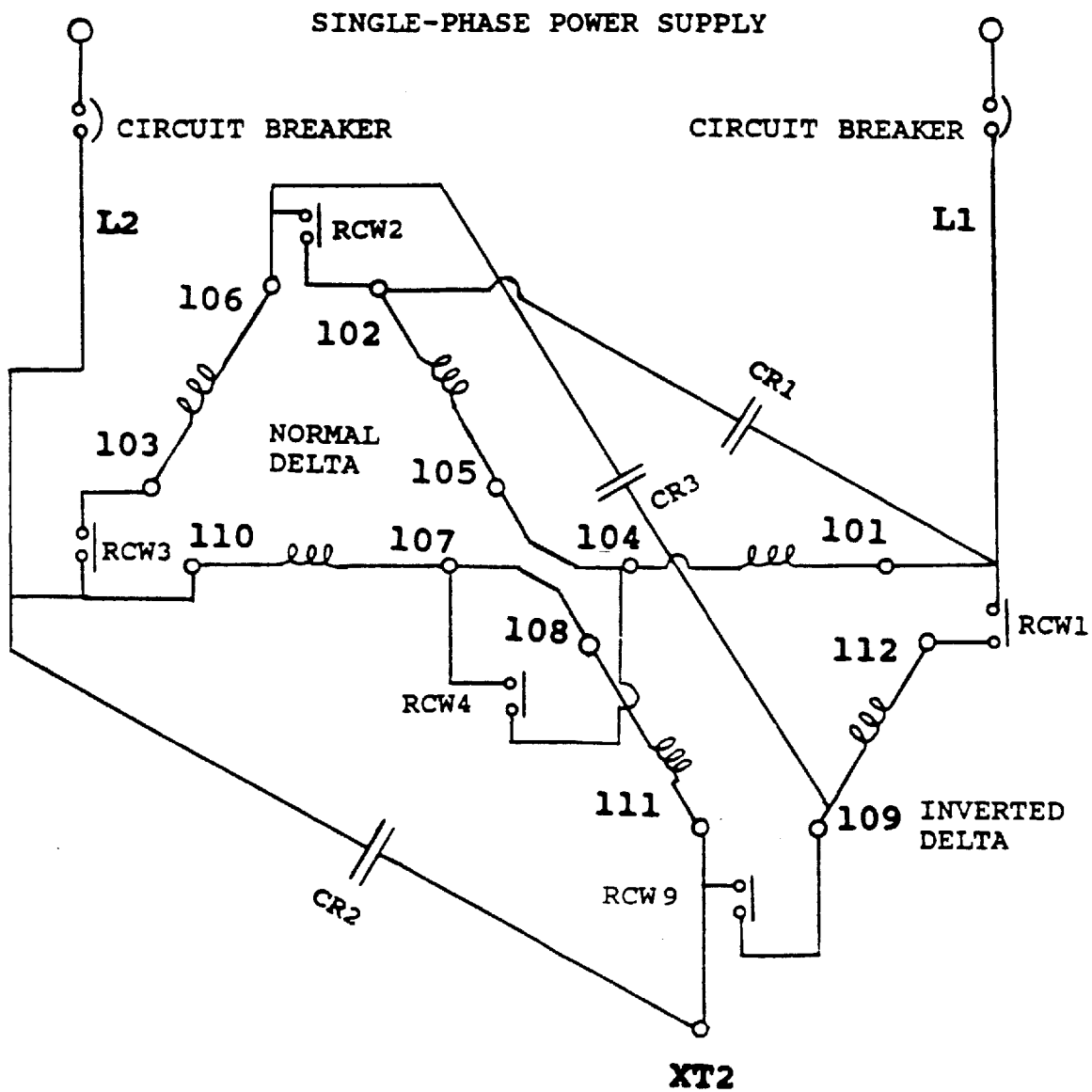
FIG. 11 is an alternate circuit for a DOUBLE-DELTA run connection.

FIG. 11 is the circuit for another motor, similar to FIG. 1. This is a dual-voltage, symmetrically-wound 6-winding delta motor. FIG. 11 is a DOUBLE-DELTA run circuit for the higher of the two dual voltages. The winding terminals are marked 101 through 112 in sequence. These correspond, respectively, to U.S.A. standard terminal notation of 1 through 12. The run connection in FIG. 11 has voltage phase sequence 103-102-107 for the normal delta and voltage phase sequence 101-109-108 for the inverted delta. This is for ClockWise CW shaft rotation.

101 is connected to supply line L1. 110 is connected to supply line L2. 104 is connected to 105. 107 is connected to 108.

A run contactor RCW is open during the temporary start mode and closed during the run mode. It has contact pairs as follows: RCW1 connects 101 to 112; RCW2 connects 102 to 106; RCW3 connects 103 to 110; RCW4 connects 104 to 107; and RCW9 connects 109 to 111. When all of these contacts are closed, the motor windings are connected in a normal delta on the left side, and in inverted delta on the right side, and the two are in series.

Run capacitor CR1 is connected between 102 and 101. Run capacitor CR2 is connected between Line L2 and 111. Run capacitor CR3 is connected between 106 and 109.

At full load, capacitor CR2 injects I30 into XT2 and into terminals 109 and 111. Capacitor CR3 injects I60 into terminals 109 and 111. Together, these two currents cause full-load currents to flow in windings 108–111 and 109–112.

Similarly, capacitor CR1 injects |I30| into terminals 102 and 106. Capacitor CR3 injects |I60| into terminals 102 and 106. Together, these two currents cause full-load currents to flow in windings 102–105 and 106–103.

Double-Wye Start Connection

Figure 12:
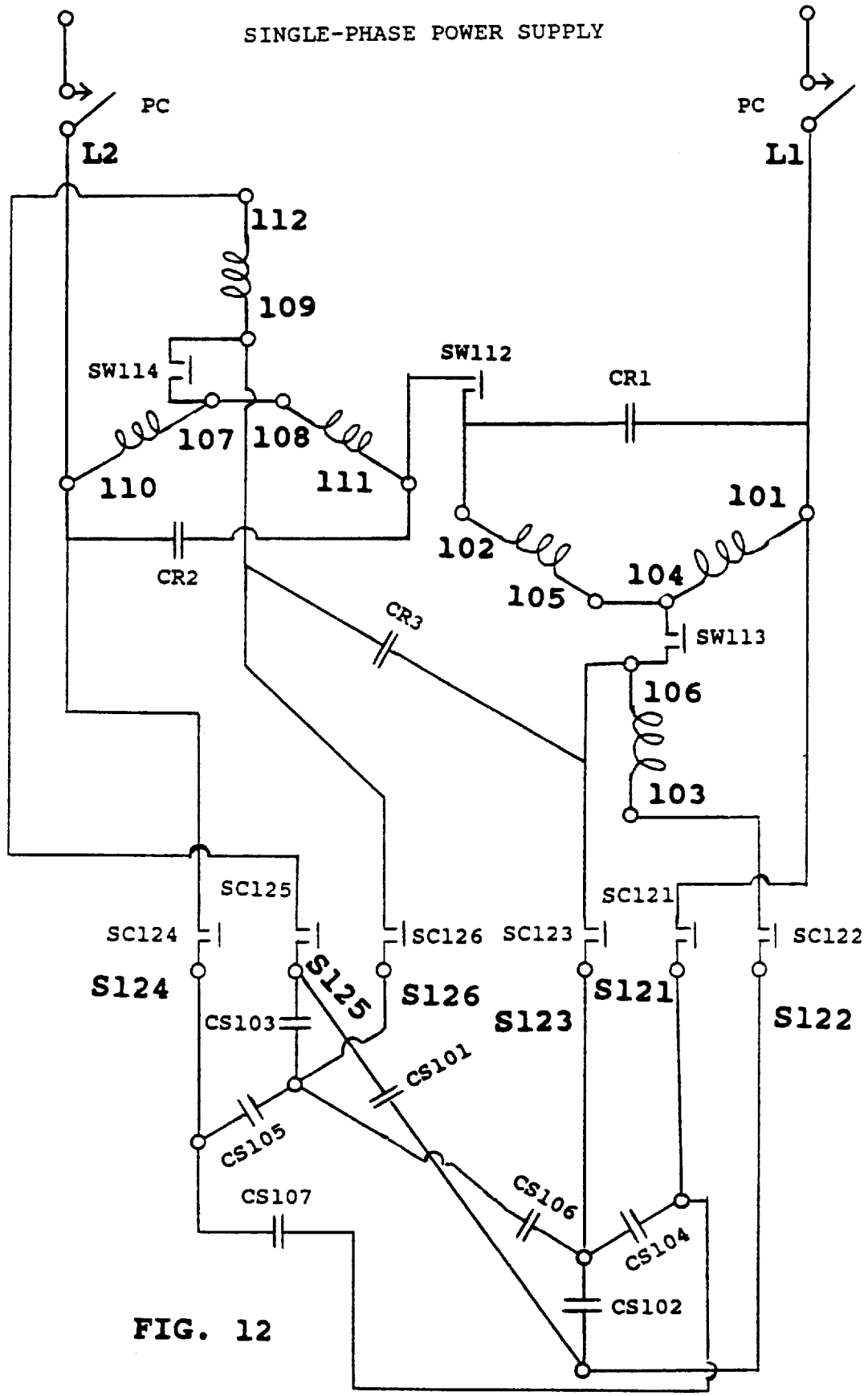
FIG. 12 is an alternate circuit for a soft-start using a DOUBLE-WYE connection, to be used with FIG. 11 or FIG. 13.

FIG. 12 is the starting circuit for the same motor as in FIG. 11. A starting contactor for the windings has contact pairs as follows: SW112 connects 102 to 111; SW113 connects 104 to 106; SW114 connects 107 to 109. When SW is actuated, all of these contacts are closed in FIG. 12. The winding circuit is a normal wye on the right, an inverted wye on the left, and the two wyes are in series between L1 and L2.

The connection of the run capacitors has not been changed. During starting, CR1 and CR2 are in series across the power supply. This improves the power factor. CR3 is between 106 and 109, and performs the same function as CS106, to be described later.

A start contactor SC is temporarily closed during the starting interval. Its contacts are: SC121 connects L1 to capacitor bank terminal S121; SC122 connects 103 to bank terminal S122; SC123 connects 106 to bank terminal S123; SC124 connects L2 to S124; SC125 connects 112 to S125; and SC126 connects 109 to S126.

In the start capacitor bank, the CS capacitors are connected as follows: CS101 is connected between S125 and S122; CS102 is connected between S122 and S123; CS103 is connected between S125 and S126; CS104 is connected between S121 and S123; CS105 is connected between S124 and S126; CS106 is connected between S123 and S126; and CS107 is connected between S121 and S124.

During starting, CS101 is between 112 and 103. It delivers 41% power-factor current with an equivalent lag angle of 66° into 103 and 112. CS102 delivers −10% power-factor current with an equivalent lag angle of 96° into 103. CS103 delivers −10% power-factor current with an equivalent lag angle of 96° into 112. CS104 delivers −10% power-factor current with an equivalent lag angle of 96° into 104. CS105 delivers −10% power-factor current with an equivalent lag angle of 96° into 107. CS106 delivers −10% power-factor current with an equivalent lag angle of 96° into both 105 and 108. Note that the run capacitor CR3 performs the same function as the start capacitor CS106. When these capacitors are chosen as described earlier, the locked-rotor currents and voltages in all of the windings will be balanced.

CS107 is a power-factor correction capacitor. I can choose it to produce unity-power-factor line current at the locked-rotor state.

Contactors

The contactors for FIG. 11 and FIG. 12 can be similar to those in FIG. 8. The number of poles or contact pairs on each is summarized in this table:

| FIG. | Run contacts | Start Winding contacts | Start Capacitor contacts |
|---|---|---|---|
| 1 | 6 | | |
| 2 | | 4 | 4 |
| 3 | | 4 | 4 |
| 4 | | | 4 |
| 6 | 10 | 7 | 3 |
| 11 | 5 | | |
| 12 | | 3 | 6 |
| 13 | 5 | PLUS 2 EXTRA POWER CONTACTOR PC POLES. | |

In FIG. 11, there is one fewer run poles than in FIG. 1. In FIG. 12, there is one more start poles than in either FIG. 2 or FIG. 3.

Self-Excitation

When a motor is coasting to a stop, and there is a capacitor across one of the windings, there is a possibility that the capacitor will excite self-excitation at a particular speed. In FIG. 1, CR3 is across 2-5-8-11. Only CR3 has the possibility of self-excitation. This is a small capacitor, compared with CR1 and compared with the magnetic vars, so self-excitation will not occur. In the event that a motor shows an undesirable self-excitation on coasting to stop, a pole of the power contactor PC can be inserted in series with CR3.

In FIG. 4, each run capacitor is across two windings in series. To prevent self-excitation, extra poles of the power contactor can be inserted in series with each run capacitor.

Figure 13:
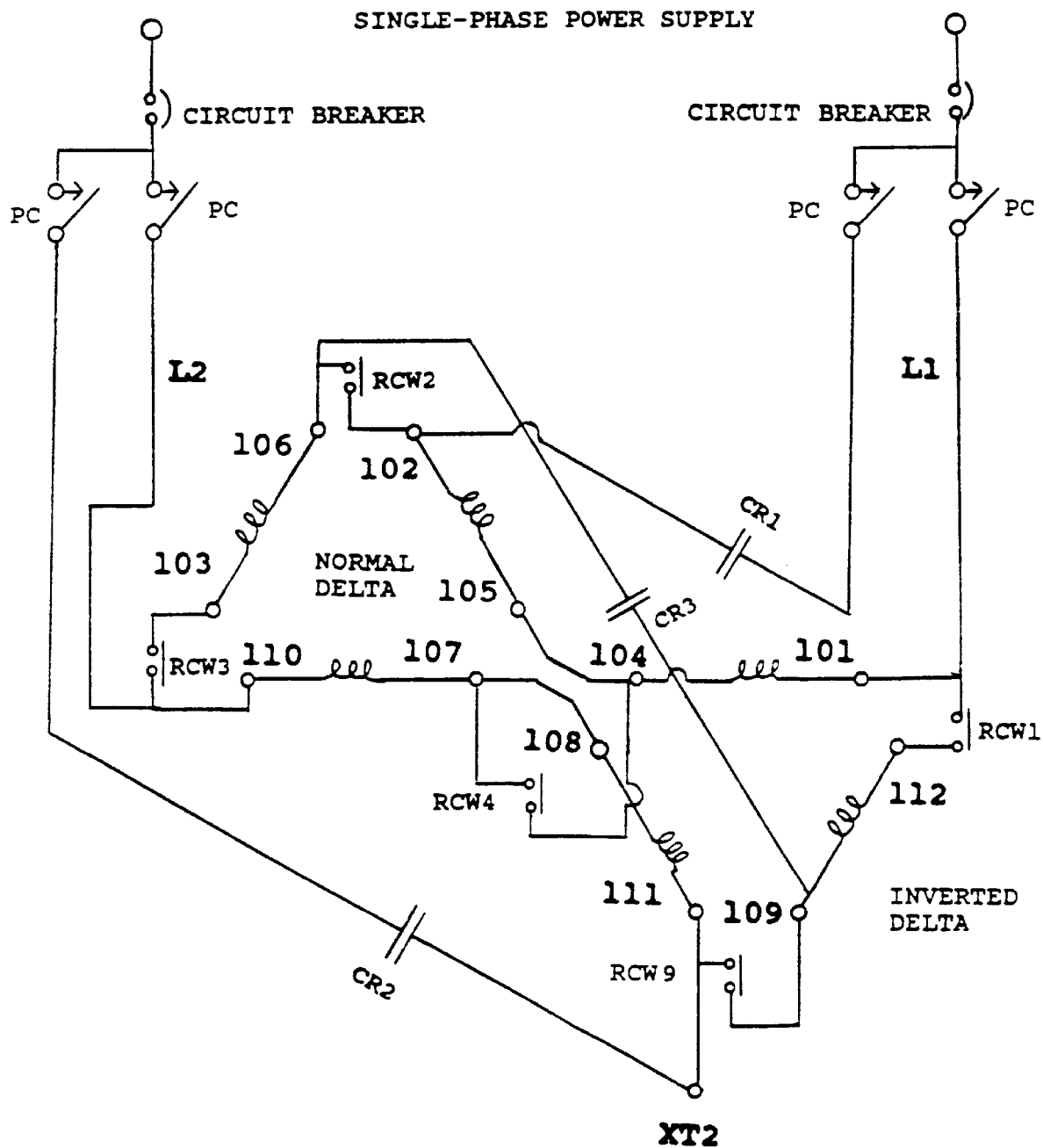
FIG. 13 is an alternate run circuit with self-excitation suppression to augment FIG. 11.

In FIG. 11, CR1 is in parallel with 101-104-105-102. CR2 is in parallel with 110-107-108-111. Extra poles of the power contactor PC can be inserted in series with the capacitors to prevent self-excitation when coasting to a stop. This is shown in FIG. 13.

I have provided a dual-voltage, delta-wound, 3-phase induction motor with 6 windings, a single-phase supply with two lines, a first normal delta connection of three of the windings, a second inverted delta connection of the other three of the windings, connecting one terminal of the normal delta to one of the supply lines, connecting one terminal of the inverted delta to the other supply line, connecting the two deltas in series across the single-phase power supply by connecting another terminal of the normal delta to another terminal of the inverted delta, a first means to connect a first capacitor between the first one of the power supply lines and the third terminal of the inverted delta, a second means to connect a second capacitor between the second other supply line and the third terminal of the normal delta, and third means to temporarily reconnect the windings into a double-wye configuration for the starting interval.

I have provided a motor as above with the double-wye consisting of a normal wye connection of three of the windings, an inverted wye connection of the other three of the windings, one terminal of the normal wye connected to one of the supply lines, one terminal of the inverted wye connected to the other of the supply lines, a second terminal of the normal wye connected to a second terminal of the inverted wye to place the two wyes in series across the said supply, and a capacitor connected between the third terminal of the normal wye and the third terminal of the inverted wye.

I have provided a motor as above, with a two-pole circuit breaker and a four-pole power contactor, one power-contactor pole connects one pole of the circuit breaker to the first one line of the power supply, another power-contactor pole connects the other pole of the circuit breaker to the other line of the power supply, a third power-contactor pole is the first means in series with the said first capacitor, and the fourth power-contactor pole is the second means in series with the said second capacitor.

Figure 14:
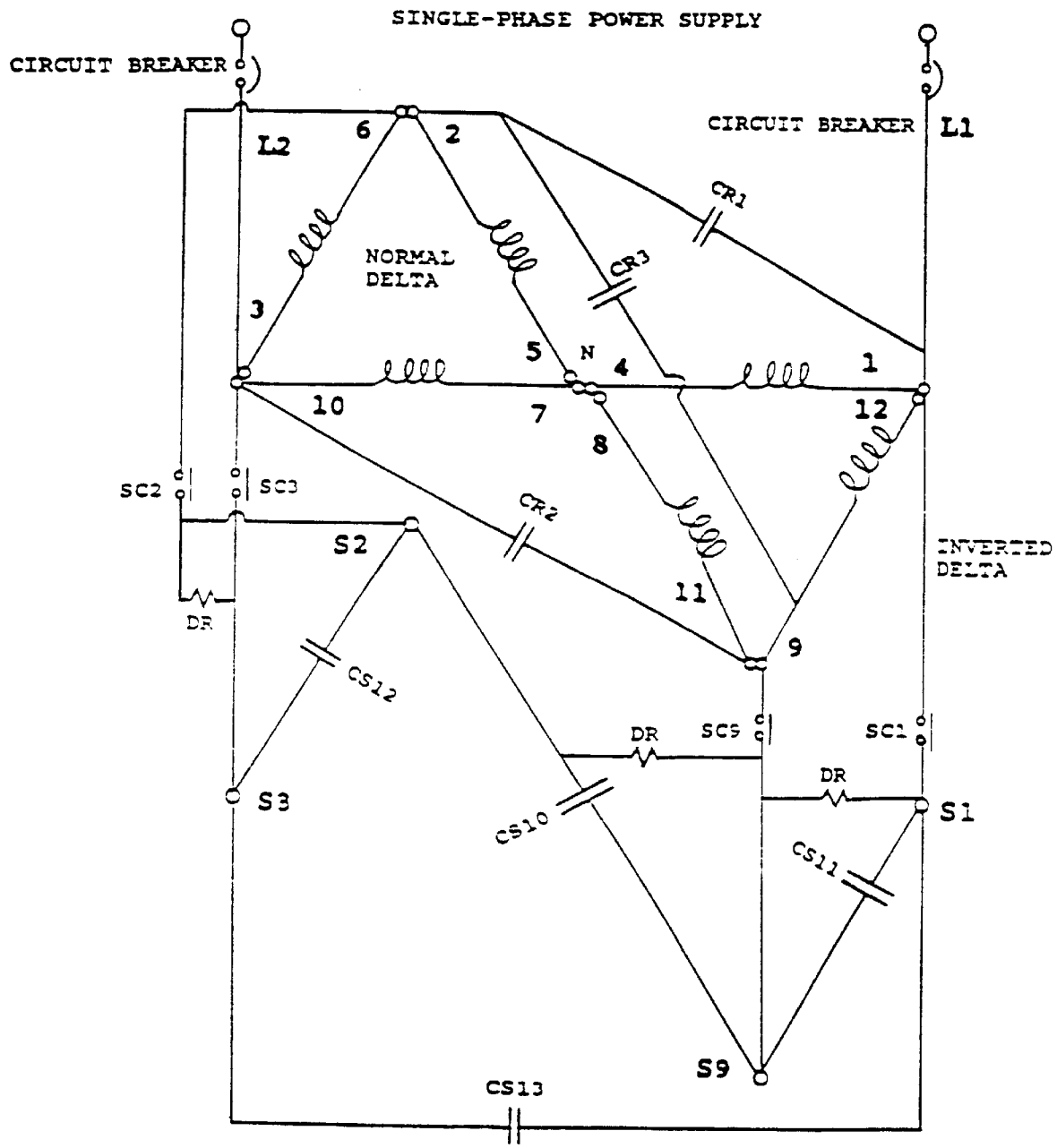
FIG. 14 shows the addition of discharge resistors across the capacitors in FIG. 4.

FIG. 14 is the same as FIG. 4 with the addition of capacitor voltage discharge resistors DR across the starting capacitors, to drain off their trapped charge after the motor is running. This leaves the capacitors uncharged for the next time that the motor is started.

Figure 15:
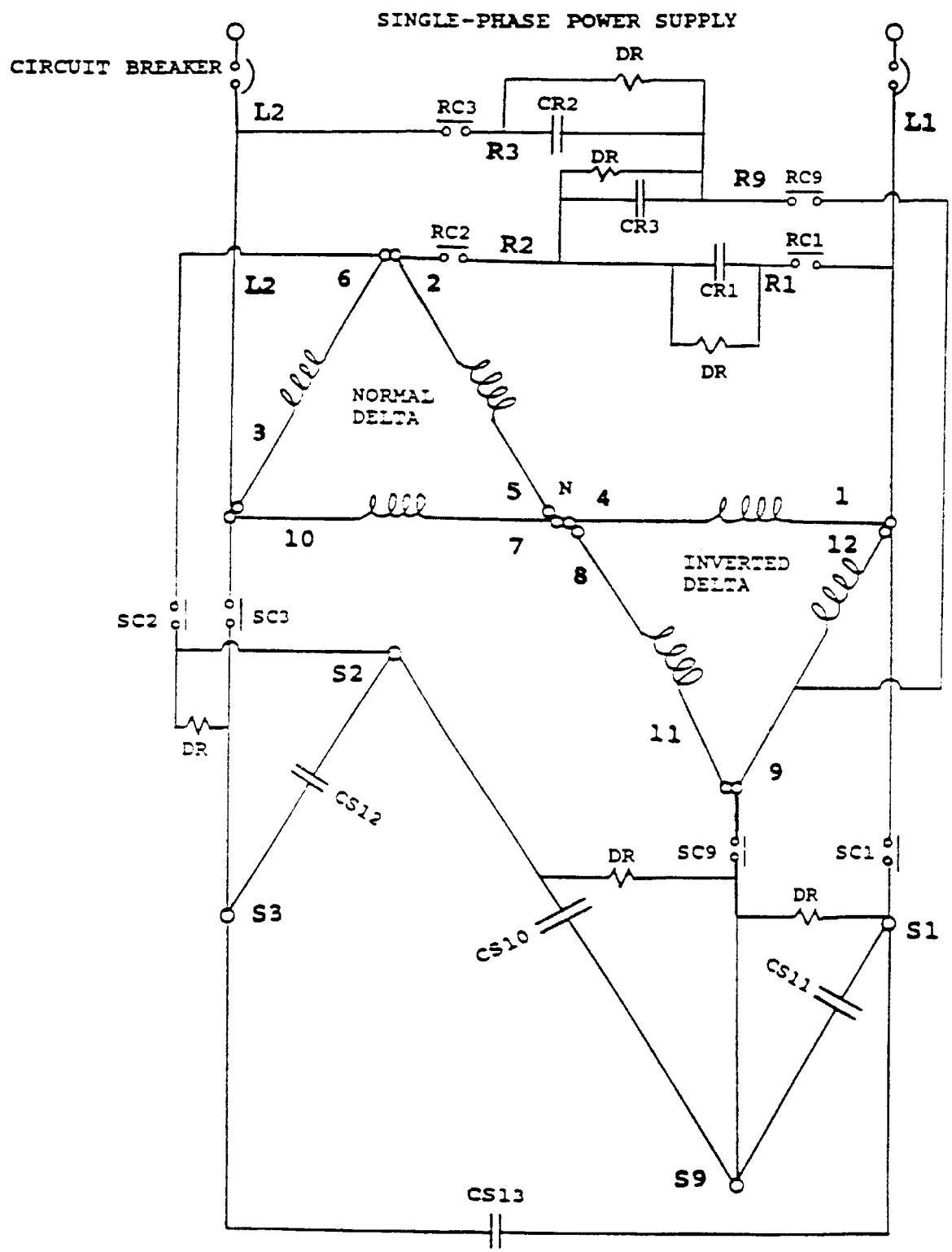
FIG. 15 shows the addition of switched run contactors to FIG. 14.

FIG. 15 is the same as FIG. 14, with the addition of the run contactors RC1, RC2, RC3 and RC9 to disconnect the run capacitors CR1, CR2 and CR3 during the starting mode. Discharge resistors DR are provided to drain off the trapped charge immediately after stopping the motor, so that the run capacitors are uncharged for the next time that the motor is started.

Figure 16:
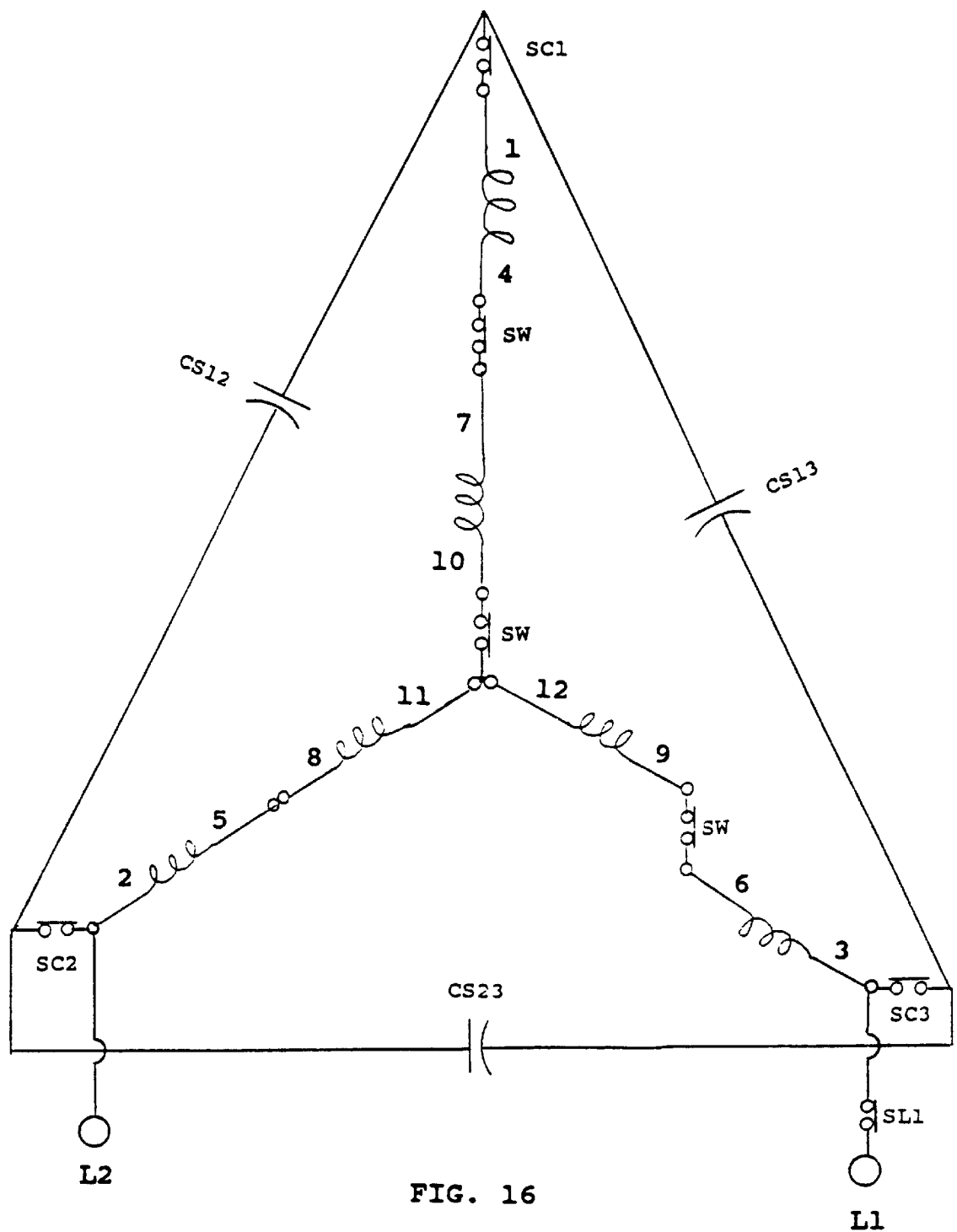
FIG. 16 is a single-phase wye-start circuit applicable to FIG. 1, FIG. 11, FIG. 13 and FIG. 17.

FIG. 16 is a single-phase reduced-flux wye-start configuration for a delta-wound motor. For starting, the three start-winding contacts SW are closed, as shown in FIG. 16. The three start-capacitor contacts SC1, SC2 and SC3 are closed. Single-phase power is supplied by line L2 and by Line L1 through the start-line contacts SL1. The supply voltage is V volts. The voltage on each winding is 0.29 V, which is 58% of rated voltage. The locked-rotor torque is one-third of the full-voltage three-phase delta-connection.

The reduced-voltage locked-rotor winding current is LRWA at a power factor of LRPF and current lag angle of $\phi = \cos^{-1}$ (LRPF). Start capacitor CS13 between 3 and 1 injects into terminal 1 a current I60 which lags the winding voltage by 60°. Start capacitor CS12 between 2 and 1 injects into terminal 1 a current I120 which lags the winding voltage by 120°. LRWA is resolved into these two components, which are 60° apart.

$$I60 = 1.155 \ (LRWA) \sin (120 - \phi).$$

$$I120 = 1.155 \ (LRWA) \sin (\phi - 60).$$

The start capacitors have voltage V across them. At 60 hertz, they are $$CS13 = I60 \ /(377 \ V).$$

$$CS12 = I120 \ /(377 \ V).$$

With thee two capacitors, the locked-rotor winding currents are balanced. Start capacitor CS23 is across the supply line, and is chosen to produce unity power-factor locked-rotor current in the power supply.

The circuit in FIG. 16 has only three start capacitors, and only three capacitor cable contacts, SC1, SC2 and SC3. In these respects, it is simpler than FIG. 2, and can be used instead of FIG. 2.

Figure 17:
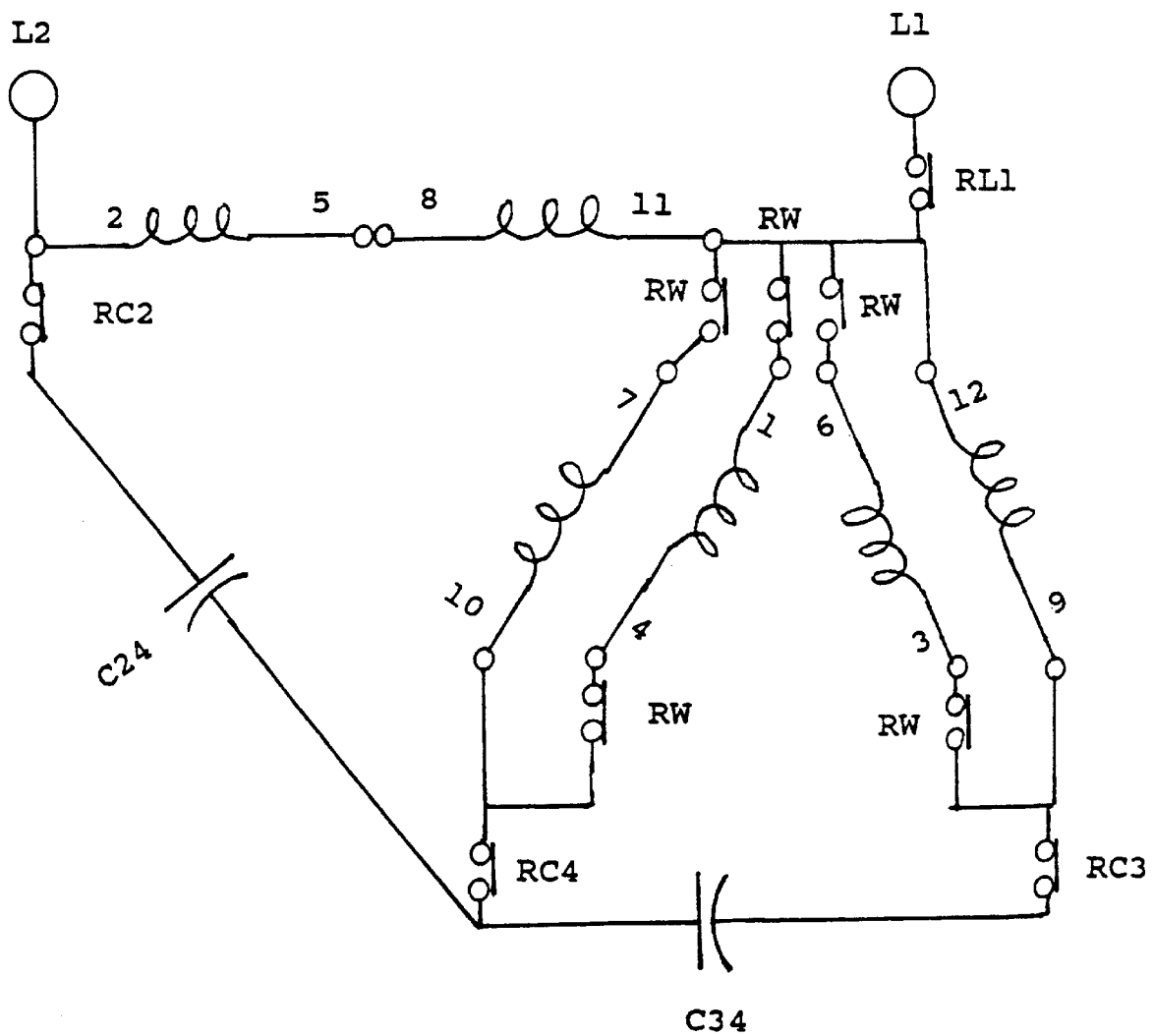
FIG. 17 is a full-voltage single-phase run circuit for a delta-wound motor.

FIG. 17 is a single-phase full-voltage run connection of a delta-wound motor. The terminal designations are the same as in FIG. 16. The direction of rotation is CW. The run-winding contactor RW closes the five RW contact pairs shown in FIG. 17. Windings 3–6 and 6–12 are connected in parallel, whereas in FIG. 16 they were in series. Windings 1–4 and 7–10 are connected in parallel, whereas in FIG. 16 they were in series. Run contactor RL1 connects line L1 to the winding terminals 1, 6, 7, 11 and 12. The voltages across these parallel sets are each V/2, where V is the supply voltage and is also the voltage from 2 to 11.

A run-capacitor cable is connected by three contact sets RC2, RC3 and RC4 to two run capacitors C24 and C34, the former being connected between terminal 2 and terminal 4, and the latter being connected between terminal 3 and terminal 4. Capacitor C34 has a voltage across it of V/2, in phase with the supply voltage. This delivers a current into the windings 3–6 and 9–12, which is 90° advanced with respect to the supply voltage. This current lags the winding voltage by 30°, and has a power-factor of 86.6%. For many large motors, the winding power-factor is this amount. It will first be assumed that this motor has the power-factor of 86.6%. Let I34 be $|I30| \angle 90°$. C34 is chosen so that I30 is equal to the full-load current in the parallel windings 3–6 and 9–12.

The parallel windings 1–4 and 7–10 carry the same magnitude of current $|I30|$ at an angle of 30°. Capacitor C24 is chosen so that it delivers the sum of the two sets of winding currents.

$$IC24 = I34 + IRC4 = |I30| \angle 90° + |I30| \angle 30° = (1.732) \ |I30| \angle 60°.$$

The two capacitors are $$C34 = |I30|/(377 \ V/2) = 2|I30|/(377).$$

$$C24 = (1.732) \ |I30|/(377 \times (0.866 \ V)) = 2|I30|/(377).$$

The two capacitors have the same microfarads. With these values, the full-load currents will be balanced in the windings. The performance of this circuit is similar to FIG. 1, FIG. 11 and FIG. 13.

Motors with a full-load power-factor less than 86.6% can have additional current components introduced in the parallel connections to bring the winding currents to their rated full-load power-factor. An additional capacitor C23, not shown, can be connected between RC2 and RC3 to introduce another current component I50 into 3 and 9 to adjust the winding current power factor. This current component lags the winding voltage by approximately 50°. An additional capacitor C14, not shown, can be connected between 1 and RC4, to introduce another current component I90 into 4 and 10, to adjust the winding current power-factor. This current component lags the winding voltage by approximately 90°.

Notes

Any current I at phase angle A can be resolved into two components where the first component is IX at phase angle X and the second component is IY at phase angle Y, and phase angle A lies between X and Y, and Y is larger than X, and the difference D is Y-X. The resolution is $$D=Y-X \ IX=I \sin(Y-A)/\sin D \ IY=I \sin(A-X)/\sin D.$$

Result:

$$IX\angle X° + IY\angle Y° = I\angle A°$$

I claim:

1. An induction motor with 6 windings wherein 3 of the windings comprise an upright delta connection with three corners and the other 3 windings comprise an inverted delta connection with another three corners, two lines of a single-phase power supply, a first corner of said inverted delta connected to a first corner of said upright delta, a second corner of said upright delta connected to a first line of said supply, a second corner of said inverted delta connected to a second line of said supply, creating the series connection of the upright delta and the inverted delta connected across the two lines of said single-phase power supply, the two external winding corners are the two delta corners not connected together and not connected to the supply lines, one run capacitor connected between one external corner and one line of the power supply, a second run capacitor connected between the other external corner and the other line of the power supply, and during a temporary starting interval, the windings are reconnected in a three-terminal wye which has a wye center, with the power supply lines connected to two of the wye terminals, and a starting capacitor connected between the third wye terminal and the said wye center and including a second starting capacitor connected between said third wye terminal and one of the supply lines.

2. An induction motor as in claim 1, with a third run capacitor connected between the two said external corners.

3. An induction motor as in claim 1 with two additional starting capacitors, one each connected between the said first and second wye terminals and the center of the said wye.

4. An induction motor as in claim 1, with a power-factor correction starting capacitor connected between the said two lines of the said power supply.

5. An induction motor with 6 windings wherein 3 of the windings comprise an upright delta connection with three corners and the other 3 windings comprise an inverted delta connection with another three corners, two lines of a single-phase power supply, a first corner of said inverted delta connected to a first corner of said upright delta, a second corner of said upright delta connected to a first line of said supply, a second corner of said inverted delta connected to a second line of said supply, creating the series connection of the said upright delta and the inverted delta connected across the two lines of said single-phase power supply, the two external winding corners are the two delta corners not connected together and not connected to the supply lines, one run capacitor connected between one external corner and one line of the power supply, a second run capacitor connected between the other external corner and the other line of the power supply, and during a temporary starting interval, the windings are reconnected all in series with 120° phase differences in a four-terminal series circuit, with the terminal designations being in sequence in the series circuit, with the power supply lines connected to the first and third terminals in the series sequence, and a plurality of starting capacitors connected to one winding terminal, one of said starting capacitors connected between the second and fourth terminals in the said series sequence.

6. An induction motor as in claim 5, with a third run capacitor connected between the two said external corners.

7. An induction motor as in claim 5, with a second starting capacitor connected between said fourth terminal of the series sequence and the said third terminal of the series sequence.

8. An induction motor as in claim 5, with two additional starting capacitors, one additional capacitor connected between the first and second terminals of said series, and a second additional capacitor connected between the second and third terminals of said series.

9. An induction motor as in claim 5, with a power-factor correction starting capacitor connected between the said two lines of the said power supply.

10. An induction motor with 6 windings wherein 3 of the windings comprise an upright delta connection with three corners and the other 3 windings comprise an inverted delta connection with another three corners, two lines of a single-phase power supply, a first corner of said inverted delta connected to a first corner of said upright delta, a second corner of said upright delta connected to a first line of said supply, a second corner of said inverted delta connected to a second line of said supply, creating a series connection of the upright delta and the inverted delta, said series is connected across the two lines of said single-phase power supply, the two external winding corners created are the two delta corners not connected together and not connected to the supply lines, one run capacitor is connected between one said external corner and one supply line, another run capacitor is connected between the other said external corner and the other supply line, and means to temporarily connect and disconnect a starting capacitor between the said external corners.

11. An induction motor as in claim 10, with a third run capacitor connected between said external corners.

12. An induction motor as in claim 10, with two additional starting capacitors, said means temporarily connecting one additional capacitor between one external corner and one of the supply lines, and said means temporarily connecting the other additional capacitor between the other external corner and the other one of the supply lines.

13. An induction motor as in claim 10, with a power-factor-correction capacitor, said means temporarily connecting said power-factor-correction capacitor between the said two supply lines.

14. An induction motor with at least 3 windings, a two-line single-phase power supply, intermittent starting means to connect a delta winding configuration starting connection, one line from said single-phase power supply connected to one corner of said delta, the other line from said single-phase power supply connected to another corner of said delta, a temporarily connected starting capacitor between a third corner of said delta and one of said lines, means for reconnecting the motor windings for a run circuit connection into a series connection of three windings with four terminals 1, 2, 3 and 4 in sequence in the said series, said terminals having a voltage between terminals 1 and 3 which is larger than the voltage between terminals 1 and 2 and larger than the voltage between terminals 2 and 3, a voltage between terminals 2 and 4 larger than the voltage between terminals 2 and 3 and larger than the voltage between terminals 3 and 4, a voltage between terminals 1 and 4 larger than the voltage between terminals 1 and 2, means for connecting said lines to terminals 1 and 3 in said series, and means for connecting a first run capacitor between terminals 1 and 4 in said series, and means for connecting a second run capacitor between terminals 2 and 3 in said series.

15. An induction motor as in claim 14, with a third run capacitor connected between terminals 2 and 4 in said series.

16. An induction motor as in claim 14, with a second temporarily connected starting capacitor between said third corner and the other of said lines.

17. An induction motor as in claim 14, with a third temporarily connected starting capacitor between said lines.

18. An induction motor as in claim 14, wherein said means for reconnecting the motor windings is responsive to a start contactor which disconnects the said delta configuration at the end of a preselected time interval.

19. An induction motor as in claim 18, wherein said means for reconnecting the motor windings is responsive to a run contactor which connects the windings into the said series at the end of said predetermined time interval.

20. An induction motor as in claim 14, wherein said means for reconnecting the motor windings is responsive to a start contactor which disconnects the said delta configuration responsive to the motor shaft speed.

21. An induction motor as in claim 20, wherein said means for reconnecting the motor windings is responsive to a run contactor which connects the windings in the said series responsive to the motor shaft speed.

22. A motor as in claim 1, including a winding current sensor and means to actuate a start contactor to make said wye connection for the large starting and accelerating currents, and means to deactuate the start contactor and actuate a run contactor to make said series connection for the normal full-load and service-factor loads.

23. A motor as in claim 1, including computer simulation which calculates the shaft torque from a sensed state vector of winding currents and voltages, and means responsive to said calculation to actuate a start contactor to make said wye connection for the large starting and accelerating currents, and means responsive to said calculation to deactuate the start contactor and actuate a run contactor to make said series connection for the normal full-load and service-factor loads.

24. A motor as in claim 1, including computer simulation which calculates the shaft speed from a sensed state vector of winding currents and voltage, and means responsive to said calculation to actuate a start contactor to make said wye connection for the large starting and accelerating currents, and means responsive to said calculation to deactuate the start contactor and actuate a run contactor to make said series connection for the normal full-load and service-factor loads.

25. A motor as in claim 6, a winding current sensor and means responsive to a winding current to actuate the said four-terminal series connection for the large starting and accelerating currents, and means responsive to a winding current to deactuate the said four-terminal series connection and actuate the said upright delta and inverted delta series connection for the normal full-load and service-factor loads.

26. A motor as in claim 5, a computer simulation which calculates the shaft torque from a sensed state vector of winding currents and voltages, and means responsive to said calculation to actuate the said four-terminal series connection for the large starting and accelerating currents, and means responsive to said calculation to deactuate the said four-terminal series connection and actuate the said upright delta and inverted delta series run connection for the normal full-load and service-factor loads.

27. A motor as in claim 5, a computer simulation which calculates the shaft speed from a sensed state vector of winding currents and voltages, and means responsive to said calculation to actuate the said four-terminal series circuit for the large starting and accelerating currents, and means responsive to said calculation to deactuate the said four-terminal series circuit and actuate the said upright delta and inverted delta series run connection for the normal full-load and service-factor loads.

28. A motor as in claim 10, including a winding current sensor, said means to connect and disconnect a starting capacitor responsive to a winding current, to connect the start capacitor for the large starting and accelerating currents, and to disconnect the start capacitor for the normal full-load and service-factor loads.

29. A motor as in claim 10, including a computer simulation which calculates the shaft torque from a sensed state vector of winding currents and voltages, and means responsive to said calculation to connect said start capacitor for the large starting and accelerating currents, and means responsive to said calculation to disconnect said start capacitor for the normal full-load and service-factor loads.

30. A motor as in claim 10, including a computer simulation which calculates the shaft speed from a sensed state vector of winding currents and voltages, and means responsive to said calculation to connect said start capacitor for the large starting and accelerating currents, and means responsive to said calculation to disconnect said start capacitor for the normal full-load and service-factor loads.

31. A dual-voltage, delta-wound, 3-phase induction motor with 6 windings, a single-phase supply with two lines, a first normal delta connection of three of the windings, a second inverted delta connection of the other three of the windings, connecting one terminal of the normal delta to one of the supply lines, connecting one terminal of the inverted delta to the other supply line, connecting the two deltas in series across the single-phase power supply by connecting a second terminal of the normal delta to a second terminal of the inverted delta, a first means to connect a first run capacitor between the first said one of the power supply lines and the third terminal of the inverted delta, a second means to connect a second run capacitor between the said other supply line and the third terminal of the normal delta, and third means comprising a timer to generate a starting interval of time to temporarily reconnect the windings into a double-wye configuration for the said starting interval consisting of an inverted wye of three of the windings, with a first terminal of the inverted wye connected to one line of said supply, a normal wye with another three of the windings, a first terminal of the normal wye connected to the other line of said supply, and a second terminal of said inverted wye connected to a second terminal of said normal wye to place the two wyes in series across the said supply.

32. A motor as in claim 31 and a starting capacitor connected between the third terminal of the normal wye and the third terminal of the inverted wye.

33. A motor as in claim 31, with a two-pole circuit breaker and a four-pole power contactor, one power-contactor pole connects one pole of the circuit breaker to the said first one line of the power supply, another power-contactor pole connects the other pole of the circuit breaker to the said other line of the power supply, a third power-contactor pole is the said first means in series with the said first capacitor, and the fourth power-contactor pole is the said second means in series with the said second capacitor.

34. A motor as in claim 31, wherein said third means is a time-delay relay which controls the time interval during which the windings are in the said double-wye configuration for starting.

35. A motor as in claim 14 including switching means for switching said windings from the said starting connection to the said run circuit connection including contactor means having auxiliary contacts to provide a safety interlock to prevent the said run circuit connection from being superimposed on the said starting connection and vice versa.

36. An induction motor as in claim 1, including a second starting capacitor connected between the said third wye terminal and the other one of the said supply lines.

37. A dual-voltage, delta-wound, three-phase induction motor with 6 windings, a single-phase supply with two lines, two of the windings in series between the said two lines, two additional windings connected in a first parallel branch, with one first branch terminal connected to a first of the said two lines, the last two additional windings connected in a second parallel branch, with one branch terminal of said second branch connected to the said first of the said two lines, a first capacitor connected between the other first branch terminal and the other second branch terminal, and a second capacitor connected between the second of the said two lines and one of the said other branch terminals.

38. A motor as in claim 37, including means to separate the said parallel branches, and including means to reconnect the windings into a wye configuration for a temporary starting mode.

39. A motor as in claim 38, wherein two terminals of the said wye are connected respectively to the two said lines, and wherein a first starting capacitor is connected between the third terminal of said wye and one of the said lines.

40. A motor as in claim 1, including switching means for switching said windings from the said three-terminal wye for starting to the said series connection for running including contactor means having auxiliary contacts to provide a safety interlock to prevent the said three-terminal wye from being superimposed on the said series connection and vice versa.

41. A motor as in claim 5, including switching means for switching said windings from the said four-terminal series circuit for starting to the said series connection for running including contactor means having auxiliary contacts to provide a safety interlock to prevent the said four-terminal series circuit from being superimposed on the said series connection and vice versa.

42. A motor as in claim 31, including switching means for switching said windings from the said double-wye configuration for starting to the said two deltas in series for running including contactor means having auxiliary contacts to provide a safety interlock to prevent the said double-wye configuration circuit from being superimposed on the said two deltas in series connection and vice versa.

43. An induction motor as in claim 1, including a plurality of starting capacitors, wherein said starting capacitors are two of said plurality.

44. An induction motor as in claim 10, including a plurality of starting capacitors, wherein said starting capacitor is one of said plurality.

45. An induction motor as in claim 14, including a plurality of starting capacitors, wherein said temporarily connected starting cpacitor is one of said plurality.

46. An induction motor as in claim 31, including a plurality of starting capacitors, wherein two of the starting capacitors are connected to the same third terminal of one of the said wye.

47. An induction motor as in claim 38, including a plurality of starting capacitors, wherein two of the starting capacitors are connected to the same terminal of the said wye configuration.

48. An induction motor with 6 windings wherein 3 of the windings comprise an upright delta connection with three corners and the other 3 windings comprise an inverted delta connection with another three corners, two lines of a single-phase power supply, a plurality of intermittently-connected starting capacitors, a first corner of said inverted delta connected to a first corner of said upright delta, a second corner of said upright delta connected to a first line of said supply, a second corner of said inverted delta connected to a second line of said supply, creating the series connection of the upright delta and the inverted delta connected across the two lines of said single-phase power supply, the two external winding corners are the two delta corners not connected together and not connected to the supply lines, and one of said starting capacitors connected between the said two external winding corners.

49. An induction motor as in claim 48, wherein a second one of said starting capacitors is connected between one of said external corners and one of said lines of the single-phase power supply.

50. An induction motor with at least three windings, a two-line power supply, a plurality of intermittently connected starting capacitors, a series connection of three motor windings with four terminals 1, 2, 3 and 4 in sequence in the said series, one line of said power supply connected to terminal 1, the other line of said power supply connected to terminal 3, said terminals having a voltage between terminals 1 and 3 which is larger than the voltage between terminals 1 and 2 and larger than the voltage between terminals 2 and 3, a voltage between terminals 2 and 4 is larger than the voltage between terminals 1 and 4 larger than the voltage between terminals 1 and 2, and means for connecting one of said starting capacitors between terminals 2 and 4 in said series.

51. An induction motor as in claim 50, wherein a second one of said starting capacitors is connected betweeen said terminal 4 and one of said lines of the single-phase power supply.

52. A dual-voltage 3-phase induction motor with 6 windings, a single-phase supply with two lines, a plurality of intermittently-connected starting capacitors, three of the motor windings connected in the phasor form of an inverted wye, with a first terminal of the said inverted wye connected to one line of said supply, three other motor windings connected in the phasor form of a normal wye, a first terminal of the said normal wye connected to the other line of said supply, a second terminal of said inverted wye connected to a second terminal of said normal wye to place the two wyes in series across the said supply, and one of said starting capacitors connected between a third terminal of said inverted wye and a third terminal of said normal wye.

53. An induction motor as in claim 52, wherein a second one of said starting capacitors is connected between one said third terminal of one wye and one line of said supply.

54. An induction motor as in claim 53, wherein a third one of said starting capacitors is connected between the other said third terminal of the other wye and the other line of said supply.

* * * * *